US012184738B2

(12) United States Patent
Landais et al.

(10) Patent No.: US 12,184,738 B2

(45) Date of Patent: Dec. 31, 2024

(54) MOBILITY MANAGEMENT ENTITY INITIATED TRANSFER OF A PACKET DATA NETWORK CONNECTION

(71) Applicant: Nokia Technologies Oy, Espoo (FI)

(72) Inventors: Bruno Landais, Pleumeur-Bodou (FR); Laurent Thiebaut, Antony (FR); Saurabh Khare, Bangalore (IN); Georgios Gkellas, Petroupoli (GR)

(73) Assignee: Nokia Technologies Oy, Espoo (FI)

( * ) Notice: Subject to any disclaimer, the term of this patent is extended or adjusted under 35 U.S.C. 154(b) by 230 days.

(21) Appl. No.: 17/389,134

(22) Filed: Jul. 29, 2021

(65) Prior Publication Data

US 2022/0038542 A1 Feb. 3, 2022

(30) Foreign Application Priority Data

Aug. 3, 2020 (WO) ................ PCT/EP2020/071794

(51) Int. Cl.

*H04L 67/148* (2022.01)
*H04L 45/00* (2022.01)

(52) U.S. Cl.

CPC ............ *H04L 67/148* (2013.01); *H04L 45/22* (2013.01)

(58) Field of Classification Search

CPC .................................................... H04L 67/148
See application file for complete search history.

(56) References Cited

U.S. PATENT DOCUMENTS 9,998,569 B2 6/2018 Roeland et al.
2012/0063300 A1* 3/2012 Sahin ................... H04W 36/12 370/410
2015/0327114 A1* 11/2015 Gupta ................... H04W 40/36 370/235
2016/0249256 A1* 8/2016 Kweon ................. H04L 45/306
2016/0360458 A1* 12/2016 Lubenski ............. H04W 76/22
2018/0368050 A1* 12/2018 Chun .................... H04M 15/63
2019/0289506 A1* 9/2019 Park ................. H04W 36/0027
2019/0306251 A1 10/2019 Talebi Fard et al.
2020/0178158 A1 6/2020 Won et al.
(Continued)

FOREIGN PATENT DOCUMENTS

CN 111083718 A 4/2020
EP 3327992 A1 * 5/2018 ............ H04L 41/00

OTHER PUBLICATIONS

"3rd Generation Partnership Project; Technical Specification Group Core Network and Terminals; Restoration procedures; (Release 16)", 3GPP TS 23.007, V16.1.0, Mar. 2020, pp. 1-109.
(Continued)

*Primary Examiner* — Guang W Li

(74) *Attorney, Agent, or Firm* — Mintz Levin Cohn Ferris Glovsky and Popeo, P.C.

(57) ABSTRACT

There is provided an apparatus comprising means for receiving information about an identification of a network function set associated with at least one packet data network connection. The means is further configured for, in response to receiving an indication that a network function instance of the network function set supporting the at least one packet data network connection is no longer available, transferring the at least one packet data network connection from the network function instance to another network function instance comprised within the network function set.

18 Claims, 15 Drawing Sheets

(56) References Cited

U.S. PATENT DOCUMENTS

| | | | | |
|---|---|---|---|---|
| 2020/0260340 | A1* | 8/2020 | Jing | H04W 36/0022 |
| 2021/0410020 | A1* | 12/2021 | Patil | H04W 36/0033 |
| 2022/0038542 | A1* | 2/2022 | Landais | H04L 41/0893 |
| 2022/0104115 | A1* | 3/2022 | Jeong | H04W 48/18 |
| 2022/0295355 | A1* | 9/2022 | Xin | H04W 36/0022 |
| 2023/0171185 | A1* | 6/2023 | Leung | H04L 67/59 370/230 |

OTHER PUBLICATIONS

"3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3; (Release 16)", 3GPP TS 29.274 V16.3.0, Mar. 2020, pp. 1-392.

"3rd Generation Partnership Project; Technical Specification Group Services and System Aspects; System architecture for the 5G System (5GS); Stage 2 (Release 16)", 3GPP TS 23.501, V16.4.0, Mar. 2020, pp. 1-430.

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 16)", 3GPP TS 29.272, V16.2.0, Mar. 2020, pp. 1-182.

"3rd Generation Partnership Project; Technical Specification Group Services and System Aspects; Procedures for the 5G System (5GS); Stage 2 (Release 16)", 3GPP TS 23.502, V16.4.0, Mar. 2020, pp. 1-582.

"3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401, V16.6.0, Mar. 2020, pp. 1-436.

International Search Report and Written Opinion received for corresponding Patent Cooperation Treaty Application No. PCT/EP2020/071794, dated Apr. 22, 2021, 14 pages.

"3rd Generation Partnership Project; Technical Specification Group Core Network and Terminals; Interface between the Control Plane and the User Plane Nodes; Stage 3 (Release 16)", 3GPP TS 29.244 V16.4.0, Jun. 2020, pp. 1-310.

"3rd Generation Partnership Project; Technical Specification Group Core Network and Terminals; 5G System; Restoration Procedures (Release 16)", 3GPP TS 23.527, V16.3.0, Jun. 2020, pp. 1-23.

"Restoration of PON Connections after a PGW-C/SMF Change", 3GPP TSG-CT WG4 Meeting #101e, C4-205149, Nokia, Nov. 3-13, 2020, 9 pages.

3rd Generation Partnership Project; Change Request, Support of Network Address Translation un UP Function, Ericsson; 3GPP TSG-CT WG4 Meeting #94, Portoroz, Slovenia; C4-194233, Oct. 2109, 24 pages.

Chinese Office Action and Search Reported from co-pending Application No. CN 2020801058323, dated Aug. 12, 2024, 16 pages. (Machine Translation of Office Action attached.).

* cited by examiner

EPS
5GS
UE
601
UE
605
MME
603
AMF
607
HSS/UDM
615
PDN connection
PDU connection
609
PGW
SMF
611a
PGW
SMF
611b
PGW
SMF
611c
PGW
SMF
611d
UDSF
613

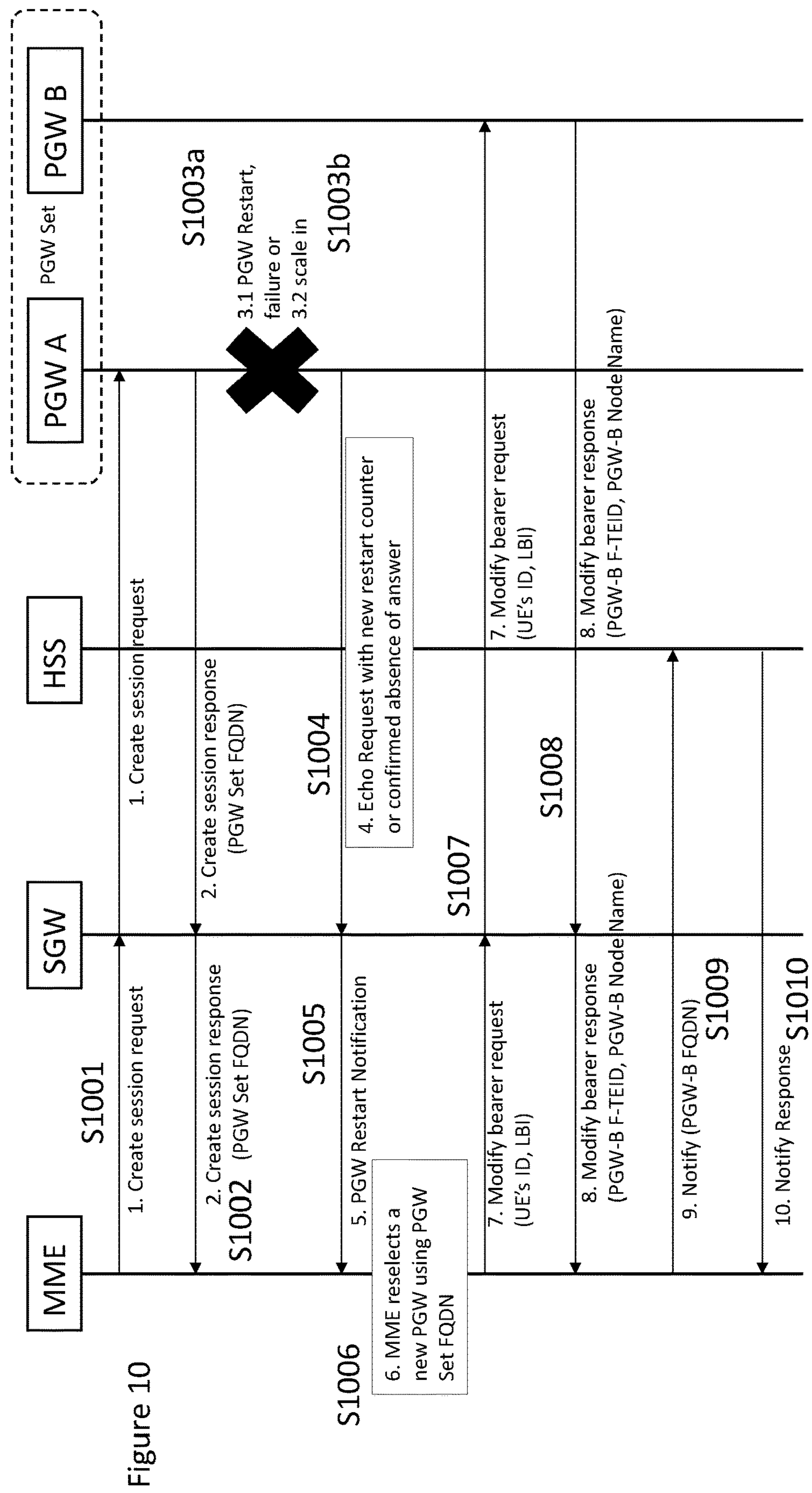

Figure 10
MME
SGW
HSS
PGW A
PGW B
PGW Set
S1001
1. Create session request
1. Create session request
2. Create session response (PGW Set FQDN)
S1002
2. Create session response (PGW Set FQDN)
S1003a
3.1 PGW Restart, failure or 3.2 scale in
S1003b
S1004
4. Echo Request with new restart counter or confirmed absence of answer
S1005
5. PGW Restart Notification
S1006
6. MME reselects a new PGW using PGW Set FQDN
S1007
7. Modify bearer request (UE's ID, LBI)
7. Modify bearer request (UE's ID, LBI)
S1008
8. Modify bearer response (PGW-B F-TEID, PGW-B Node Name)
8. Modify bearer response (PGW-B F-TEID, PGW-B Node Name)
9. Notify (PGW-B FQDN)
S1009
10. Notify Response
S1010

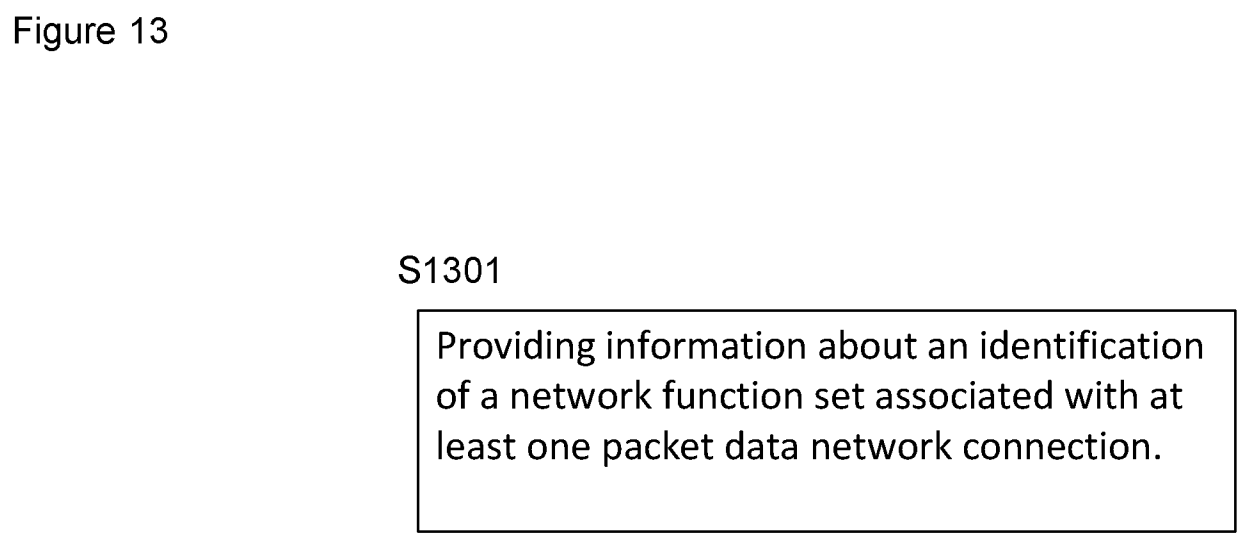

S1301

Providing information about an identification of a network function set associated with at least one packet data network connection.

Figure 13

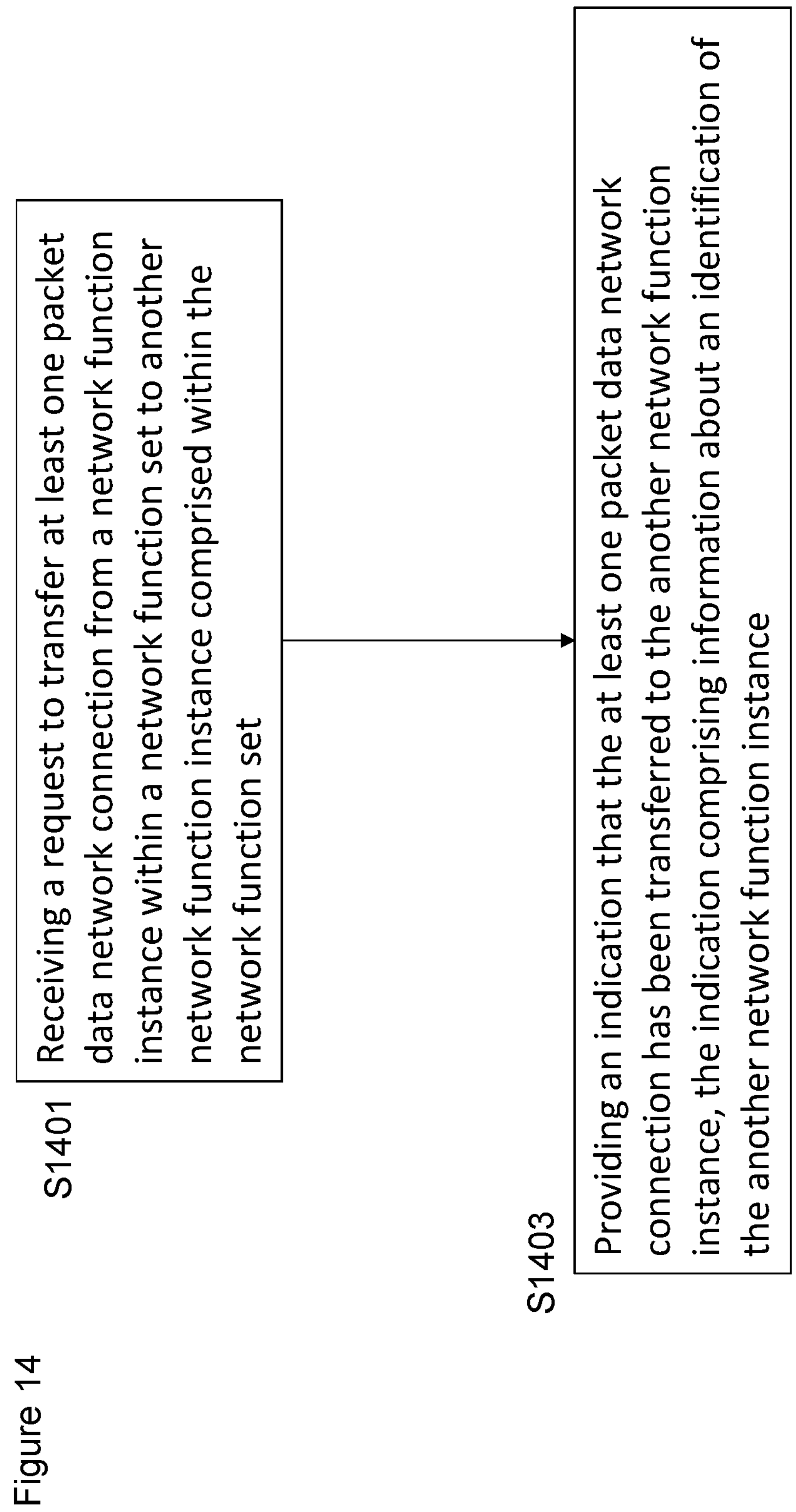
Figure 14
S1401
Receiving a request to transfer at least one packet data network connection from a network function instance within a network function set to another network function instance comprised within the network function set
S1403
Providing an indication that the at least one packet data network connection has been transferred to the another network function instance, the indication comprising information about an identification of the another network function instance

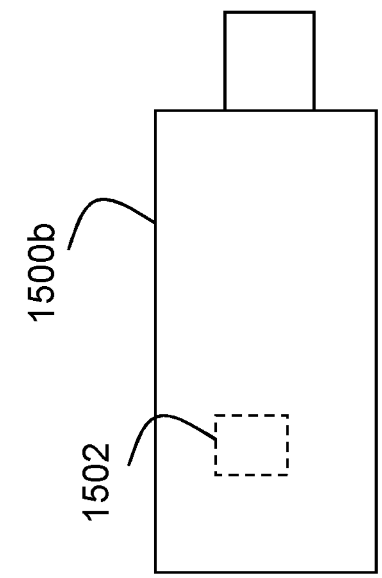
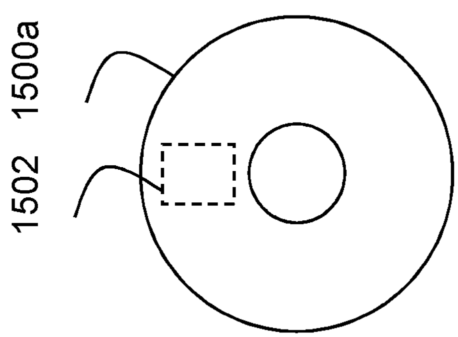
Figure 15

MOBILITY MANAGEMENT ENTITY INITIATED TRANSFER OF A PACKET DATA NETWORK CONNECTION

FIELD

The present application relates to an apparatus, method and computer program.

BACKGROUND

A communication system be a facility that enables communication sessions between two or more entities such as user terminals, base stations/access points and/or other nodes by providing carriers between the various entities involved in the communications path. A communication system can be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

SUMMARY

According to an aspect, there is provided an apparatus comprises means for: receiving information about an identification of a network function set associated with at least one packet data network connection; and in response to receiving an indication that a network function instance of the network function set supporting the at least one packet data network connection is no longer available, transferring the at least one packet data network connection from the network function instance to another network function instance comprised within the network function set.

The means for transferring may be further configured for initiating a transfer of the at least one packet data network connection from the network function instance to another network function instance comprised within the network function set.

The means for transferring may be further configured for receiving a transfer request for the at least one packet data network connection from the network function instance to another network function instance comprised within the network function set.

The information about the identification of the network function set may be received during one of: a packet data network connection establishment, and an inter-system mobility of a packet data connection The means may be further configured to perform: in response to receiving the indication that the network function instance is no longer available, maintaining the context of the at least one packet data network connection and transferring the at least one packet data network connection to the another network function instance comprised within the network function set.

The context of the at least one packet data network connection may comprise at least one of: an international mobile subscriber identity, an international mobile equipment identity, a globally unique temporary identity, an access point name, a packet data gateway identifier, a packet data gateway internet protocol address for an S5 or S8 interface, a packet data gateway tunnel endpoint identifier for an S5 or S8 interface, a mobility management entity internet protocol address for an S11 interface, a mobility management entity tunnel endpoint identifier for the S11 interface and a serving gateway internet protocol address for the S11 interface.

The means may be further configured to perform: providing a session request message during a packet data network connection establishment to the network function instance comprising an indication that the apparatus supports transferring packet data network connections from one network function instance to another network function instance in the network function set.

The means may be further configured to perform: providing a modify bearer request message during an inter-system mobility of a packet data connection to the network function instance comprising an indication that the apparatus supports transferring packet data network connections from one network function instance to another network function instance in the network function set.

The means may be further configured to perform: selecting the another network function instance of the network function set for the at least one packet data network connection to be transferred to, based on the received information about an identification of a network function set.

The means may be further configured to perform: receiving an indication that the another network function instance has been selected for the at least one packet data network connection.

The means may be further configured to perform: when transferring the at least one packet data network connection to the another network function instance, providing a message comprising an identification of a user subscription, or user equipment, associated with the at least one packet data network connection, and information about the default bearer for the at least one packet data network connection, to the another network function instance.

The means may be further configured to perform: receiving information about the another network function instance that the at least one packet data network connection is being transferred to.

The means may be further configured to perform: receiving information about the another network function instance which comprises a fully qualified domain name of the another network function instance.

The information about the another network function instance may comprise an internet protocol address and control plane identifier of a general packet radio services tunnelling protocol control plane tunnel for the packet data network connection at the another network function instance.

At least one of the network function instance and the another network function instance may comprise a session management function/packet data network gateway control plane, SMF/PGW-c, instance.

The information about the identification of the network function set may be comprised within one of: a create session response message, and a modify bearer response message.

The information about the identification of the network function set may comprise a domain name of the network function set.

The information about the identification of the network function set comprises a fully qualified domain name of the network function set.

The network function instance may be no longer available due to at least one of: failure, restart, and scale-in.

The indication that the network function instance is no available is received in a gateway restart notification message.

The means may be further configured to perform: notifying a home subscriber server that the at least one packet data network connection has been transferred from the network function instance to the another network function instance, so that the home subscriber server can update stored information about the at least one packet data network connection.

The apparatus may be comprised within one of: a mobility management entity, and a serving gateway entity.

According to another aspect, there is provided a method comprising: receiving information about an identification of a network function set associated with at least one packet data network connection; and in response to receiving an indication that a network function instance of the network function set supporting the at least one packet data network connection is no longer available, transferring the at least one packet data network connection from the network function instance to another network function instance comprised within the network function set.

The transferring may comprise initiating a transfer of the at least one packet data network connection from the network function instance to another network function instance comprised within the network function set.

The transferring may comprise receiving a transfer request for the at least one packet data network connection from the network function instance to another network function instance comprised within the network function set.

The information about the identification of the network function set may be received during one of: a packet data network connection establishment, and an inter-system mobility of a packet data connection The method may comprise: in response to receiving the indication that the network function instance is no longer available, maintaining the context of the at least one packet data network connection and transferring the at least one packet data network connection to the another network function instance comprised within the network function set.

The context of the at least one packet data network connection may comprise at least one of: an international mobile subscriber identity, an international mobile equipment identity, a globally unique temporary identity, an access point name, a packet data gateway identifier, a packet data gateway internet protocol address for an S5 or S8 interface, a packet data gateway tunnel endpoint identifier for an S5 or S8 interface, a mobility management entity internet protocol address for an S11 interface, a mobility management entity tunnel endpoint identifier for the S11 interface and a serving gateway internet protocol address for the S11 interface.

The method may comprise: providing a session request message during a packet data network connection establishment to the network function instance comprising an indication that the apparatus supports transferring packet data network connections from one network function instance to another network function instance in the network function set.

The method may comprise: providing a modify bearer request message during an inter-system mobility of a packet data connection to the network function instance comprising an indication that the apparatus supports transferring packet data network connections from one network function instance to another network function instance in the network function set.

The method may comprise: selecting the another network function instance of the network function set for the at least one packet data network connection to be transferred to, based on the received information about an identification of a network function set.

The method may comprise: receiving an indication that the another network function instance has been selected for the at least one packet data network connection.

The method may comprise: when transferring the at least one packet data network connection to the another network function instance, providing a message comprising an identification of a user subscription, or user equipment, associated with the at least one packet data network connection, and information about the default bearer for the at least one packet data network connection, to the another network function instance.

The method may comprise: receiving information about the another network function instance that the at least one packet data network connection is being transferred to.

The means may be further configured to perform: receiving information about the another network function instance which comprises a fully qualified domain name of the another network function instance.

The information about the another network function instance may comprise an internet protocol address and control plane identifier of a general packet radio services tunnelling protocol control plane tunnel for the packet data network connection at the another network function instance.

At least one of the network function instance and the another network function instance may comprise a session management function/packet data network gateway control plane, SMF/PGW-c, instance.

The information about the identification of the network function set may be comprised within one of: a create session response message, and a modify bearer response message.

The information about the identification of the network function set may comprise a domain name of the network function set.

The information about the identification of the network function set comprises a fully qualified domain name of the network function set.

The network function instance may be no longer available due to at least one of: failure, restart, and scale-in.

The indication that the network function instance is no available is received in a gateway restart notification message.

The method may comprise: notifying a home subscriber server that the at least one packet data network connection has been transferred from the network function instance to the another network function instance, so that the home subscriber server can update stored information about the at least one packet data network connection.

The method may be performed by one of: a mobility management entity, and a serving gateway entity.

According to an aspect, there is provided an apparatus comprises means for: providing information about an identification of a network function set associated with at least one packet data network connection.

The means may be further configured to perform: providing an indication that a network function instance of the network function set is no longer available, so that the at least one packet data network connection can be transferred from the network function instance to another network function instance comprised within the network function set.

The identification of the network function set may comprise a fully qualified domain name.

The means may be further configured to perform: providing an echo request to a mobility management entity.

The means may be further configured to perform: providing an echo request comprising an incremented restart counter to a serving gateway.

The means may be further configured to perform: providing an echo request comprising an new restart counter to a serving gateway.

The apparatus may be comprised within a packet data gateway.

The apparatus may comprise a packet data network gateway instance.

According to an aspect, there is provided an apparatus comprises means for: receiving a request to transfer at least one packet data network connection from a network function instance within a network function set to another network function instance comprised within the network function set; and providing an indication that the at least one packet data network connection has been transferred to the another network function instance, the indication comprising information about an identification of the another network function instance.

The means may be further configured to perform: providing information about the another network function instance which comprises a fully qualified domain name of the another network function instance.

The information about the another network function instance may comprise an internet protocol address and control plane identifier of a general packet radio services tunnelling protocol control plane tunnel for the at least one packet data network connection at the another network function instance.

The means may be further configured to perform: receiving context data of a user subscriber or user equipment of the at least one packet data network connection.

The apparatus may be comprised within a packet data gateway.

The apparatus may be comprised within a packet data network gateway instance.

According to another aspect, there is provided a method comprising: providing information about an identification of a network function set associated with at least one packet data network connection.

The method may comprise: providing an indication that a network function instance of the network function set is no longer available, so that the at least one packet data network connection can be transferred from the network function instance to another network function instance comprised within the network function set.

The identification of the network function set may comprise a fully qualified domain name.

The method may comprise: providing an echo request to a mobility management entity.

The method may comprise: providing an echo request comprising an incremented restart counter to a serving gateway.

The method may comprise: providing an echo request comprising a new restart counter to a serving gateway.

The method may be performed by a packet data network gateway instance.

According to another aspect, there is provided a method comprising: receiving a request to transfer at least one packet data network connection from a network function instance within a network function ser to another network function instance comprised within the network function set; and providing an indication that the at least one packet data network connection has been transferred to the another network function instance, the indication comprising information about an identification of the another network function instance.

The method may comprise: providing information about the another network function instance which comprises a fully qualified domain name of the another network function instance.

The information about the another network function instance may comprise an internet protocol address and control plane identifier of a general packet radio services tunnelling protocol control plane tunnel for the at least one packet data network connection at the another network function instance.

The method may comprise: receiving context data of a user subscriber or user equipment of the at least one packet data network connection.

The method may be performed by a packet data network gateway instance.

According to another aspect, there is provided a set comprising: a first apparatus comprising means for: providing information about an identification of a network function set associated with at least one packet data network connection; a second apparatus comprising means for: receiving a request to transfer at least one packet data network connection from a network function instance within a network function ser to another network function instance comprised within the network function set; providing an indication that the at least one packet data network connection has been transferred to the another network function instance, the indication comprising information about an identification of the another network function instance.

At least one of: the set, the first apparatus, and the second apparatus may be comprised within a packet data gateway.

According to another aspect, there is provided an apparatus comprising: at least one processor; and at least one memory including computer program code, the at least one memory and the computer program code configured to, with the at least one processor, cause the apparatus at least to perform: receiving information about an identification of a network function set associated with at least one packet data network connection; and in response to receiving an indication that a network function instance of the network function set supporting the at least one packet data network connection is no longer available, transferring the at least one packet data network connection from the network function instance to another network function instance comprised within the network function set.

The at least one memory and the computer program code may be configured to, with the at least one processor, cause the apparatus at least to perform: initiating a transfer of the at least one packet data network connection from the network function instance to another network function instance comprised within the network function set.

The at least one memory and the computer program code may be configured to, with the at least one processor, cause the apparatus at least to perform: receiving a transfer request for the at least one packet data network connection from the network function instance to another network function instance comprised within the network function set.

The information about the identification of the network function set may be received during one of: a packet data network connection establishment, and an inter-system mobility of a packet data connection The at least one memory and the computer program code may be configured to, with the at least one processor, cause the apparatus at least to perform: in response to receiving the indication that the network function instance is no longer available, maintaining the context of the at least one packet data network connection and transferring the at least one packet data network connection to the another network function instance comprised within the network function set.

The context of the at least one packet data network connection may comprise at least one of: an international mobile subscriber identity, an international mobile equipment identity, a globally unique temporary identity, an access point name, a packet data gateway identifier, a packet data gateway internet protocol address for an S5 or S8 interface, a packet data gateway tunnel endpoint identifier for an S5 or S8 interface, a mobility management entity internet protocol address for an S11 interface, a mobility management entity tunnel endpoint identifier for the S11 interface and a serving gateway internet protocol address for the S11 interface.

The at least one memory and the computer program code may be configured to, with the at least one processor, cause the apparatus at least to perform: providing a session request message during a packet data network connection establishment to the network function instance comprising an indication that the apparatus supports transferring packet data network connections from one network function instance to another network function instance in the network function set.

The at least one memory and the computer program code may be configured to, with the at least one processor, cause the apparatus at least to perform: providing a modify bearer request message during an inter-system mobility of a packet data connection to the network function instance comprising an indication that the apparatus supports transferring packet data network connections from one network function instance to another network function instance in the network function set.

The at least one memory and the computer program code may be configured to, with the at least one processor, cause the apparatus at least to perform: selecting the another network function instance of the network function set for the at least one packet data network connection to be transferred to, based on the received information about an identification of a network function set.

The at least one memory and the computer program code may be configured to, with the at least one processor, cause the apparatus at least to perform: receiving an indication that the another network function instance has been selected for the at least one packet data network connection.

The at least one memory and the computer program code may be configured to, with the at least one processor, cause the apparatus at least to perform: when transferring the at least one packet data network connection to the another network function instance, providing a message comprising an identification of a user subscription, or user equipment, associated with the at least one packet data network connection, and information about the default bearer for the at least one packet data network connection, to the another network function instance.

The at least one memory and the computer program code may be configured to, with the at least one processor, cause the apparatus at least to perform: receiving information about the another network function instance that the at least one packet data network connection is being transferred to.

The at least one memory and the computer program code may be configured to, with the at least one processor, cause the apparatus at least to perform: receiving information about the another network function instance which comprises a fully qualified domain name of the another network function instance.

The information about the another network function instance may comprise an internet protocol address and control plane identifier of a general packet radio services tunnelling protocol control plane tunnel for the packet data network connection at the another network function instance.

At least one of the network function instance and the another network function instance may comprise a session management function/packet data network gateway control plane, SMF/PGW-c, instance.

The information about the identification of the network function set may be comprised within one of: a create session response message, and a modify bearer response message.

The information about the identification of the network function set may comprise a domain name of the network function set.

The information about the identification of the network function set comprises a fully qualified domain name of the network function set.

The network function instance may be no longer available due to at least one of: failure, restart, and scale-in.

The indication that the network function instance is no available is received in a gateway restart notification message.

The at least one memory and the computer program code may be configured to, with the at least one processor, cause the apparatus at least to perform: notifying a home subscriber server that the at least one packet data network connection has been transferred from the network function instance to the another network function instance, so that the home subscriber server can update stored information about the at least one packet data network connection.

The apparatus may be comprised within one of: a mobility management entity, and a serving gateway entity.

According to another aspect, there is provided an apparatus comprising: at least one processor; and at least one memory including computer program code, the at least one memory and the computer program code configured to, with the at least one processor, cause the apparatus at least to perform: providing information about an identification of a network function set associated with at least one packet data network connection.

The at least one memory and the computer program code may be configured to, with the at least one processor, cause the apparatus at least to perform: providing an indication that a network function instance of the network function set is no longer available, so that the at least one packet data network connection can be transferred from the network function instance to another network function instance comprised within the network function set.

The identification of the network function set may comprise a fully qualified domain name.

The at least one memory and the computer program code may be configured to, with the at least one processor, cause the apparatus at least to perform: providing an echo request to a mobility management entity.

The at least one memory and the computer program code may be configured to, with the at least one processor, cause the apparatus at least to perform: providing an echo request comprising an incremented restart counter to a serving gateway.

The at least one memory and the computer program code may be configured to, with the at least one processor, cause the apparatus at least to perform: providing an echo request comprising a new restart counter to a serving gateway.

The apparatus may be comprised within a packet data gateway.

The apparatus may be comprised within a packet data network gateway instance.

According to another aspect, there is provided an apparatus comprising: at least one processor; and at least one memory including computer program code, the at least one memory and the computer program code configured to, with the at least one processor, cause the apparatus at least to perform: receiving a request to transfer at least one packet data network connection from a network function instance within a network function set to another network function instance comprised within the network function set; and providing an indication that the at least one packet data network connection has been transferred to the another network function instance, the indication comprising information about an identification of the another network function instance.

The at least one memory and the computer program code may be configured to, with the at least one processor, cause the apparatus at least to perform: providing information about the another network function instance which comprises a fully qualified domain name of the another network function instance.

The information about the another network function instance may comprise an internet protocol address and control plane identifier of a general packet radio services tunnelling protocol control plane tunnel for the at least one packet data network connection at the another network function instance.

The at least one memory and the computer program code may be configured to, with the at least one processor, cause the apparatus at least to perform: receiving context data of a user subscriber or user equipment of the at least one packet data network connection.

The apparatus may be comprised within a packet data gateway.

The apparatus may be comprised within a packet data network gateway instance.

According to another aspect, there is provided a computer program comprising computer executable instructions which when run on one or more processors perform: receiving information about an identification of a network function set associated with at least one packet data network connection; and in response to receiving an indication that a network function instance of the network function set supporting the at least one packet data network connection is no longer available, transferring the at least one packet data network connection from the network function instance to another network function instance comprised within the network function set.

According to another aspect, there is provided a computer program comprising computer executable instructions which when run on one or more processors perform: providing information about an identification of a network function set associated with at least one packet data network connection.

According to another aspect, there is provided a computer program comprising computer executable instructions which when run on one or more processors perform: receiving a request to transfer at least one packet data network connection from a network function instance within a network function set to another network function instance comprised within the network function set; and providing an indication that the at least one packet data network connection has been transferred to the another network function instance, the indication comprising information about an identification of the another network function instance.

A computer product stored on a medium may cause an apparatus to perform the methods as described herein.

An electronic device may comprise apparatus as described herein.

In the above, various aspects have been described. It should be appreciated that further aspects may be provided by the combination of any two or more of the various aspects described above.

Various other aspects and further embodiments are also described in the following detailed description and in the attached claims.

According to some aspects, there is provided the subject matter of the independent claims. Some further aspects are defined in the dependent claims. The embodiments that do not fall under the scope of the claims are to be interpreted as examples useful for understanding the disclosure.

LIST OF ABBREVIATIONS

AF: Application Function
AUSF: Authentication Server Function
AMF: Access and Mobility Management Function
BS: Base Station
DN: Data Network
eNB: eNodeB
gNB: gNodeB
HSS: Home Subscriber Server
LTE: Long Term Evolution
MME: Mobility Management Entity
NEF: Network Exposure Function
NF: Network Function
NR: New Radio
NRF: Network Repository Function
MS: Mobile Station
PDN: Packet Data Network
PDU: Protocol Data Unit
PGW: Packet Data Network Gateway
PLMN: Public Land Mobile Network
QoS: Quality of Service
RAN: Radio Access Network
RF: Radio Frequency
SGW: Serving Gateway
SMF: Session Management Function
UE: User Equipment
UDSF: Unstructured Data Storage Function
UDM: Unified Data Management
3GPP: $3^{rd}$ Generation Partnership Project
5G: $5^{th}$ Generation
5GC: 5G Core network
5G-AN: 5G Access Network
5GS: 5G System

DESCRIPTION OF FIGURES

Embodiments will now be described, by way of example only, with reference to the accompanying Figures in which:

FIG. 10 shows another example signalling diagram between network entities:

FIG. 13 shows example method steps performed by a second network entity;

FIG. 14 shows example method steps performed by a second network entity; and

FIG. 15 shows a schematic representation of a non-volatile memory medium storing instructions which when executed by a processor allow a processor to perform one or more of the steps of the method of FIGS. 12 to 14.

DETAILED DESCRIPTION

Before explaining in detail some examples of the present disclosure, certain general principles of a wireless communication system and mobile communication devices are briefly explained with reference to FIGS. 1 to 3 to assist in understanding the technology underlying the described examples.

Figure 1:
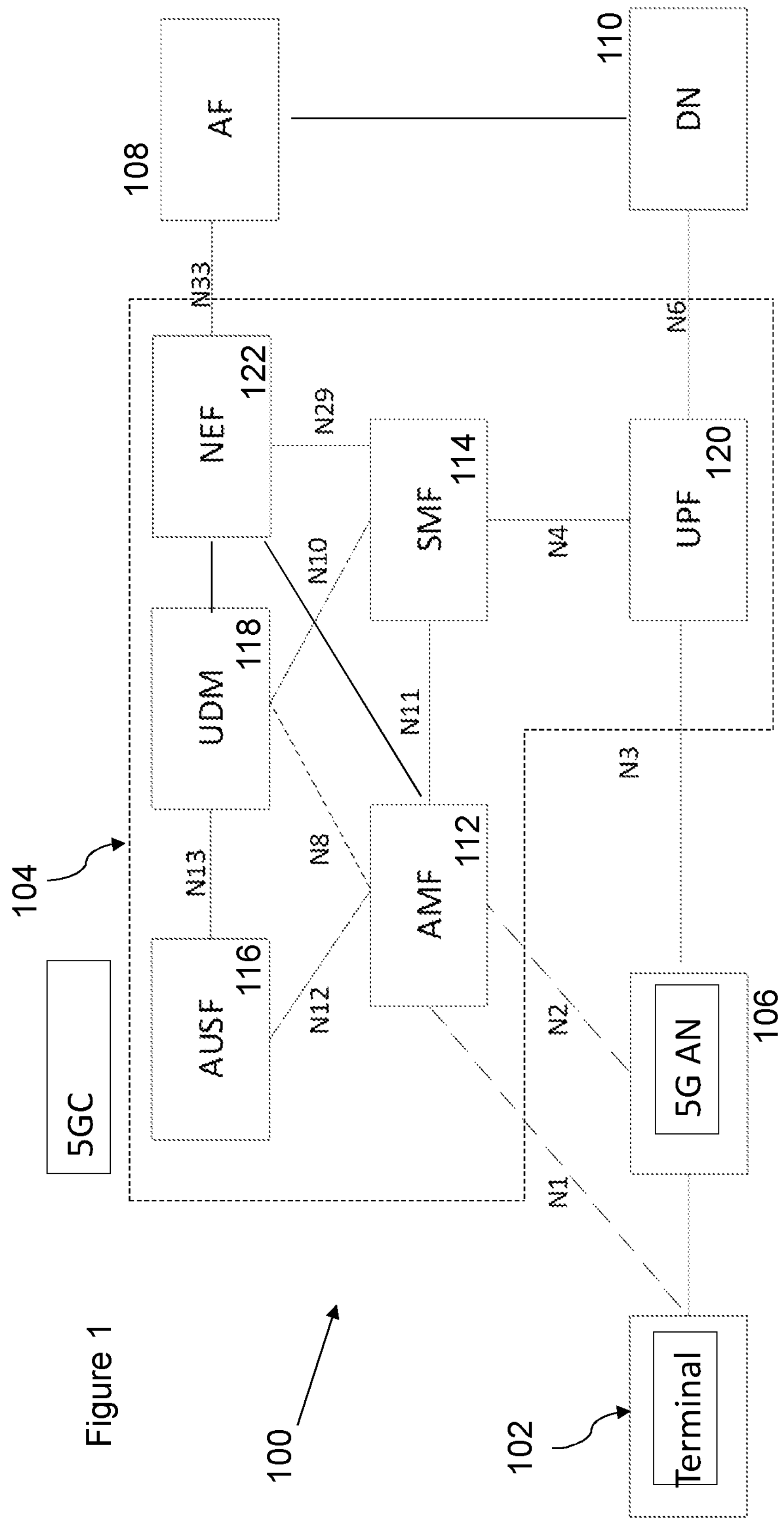
FIG. 1 shows a schematic representation of a 5G system.

In a wireless communication system 100, such as that shown in FIG. 1, mobile communication devices/terminals or user apparatuses, and/or user equipments (UE), and/or machine-type communication devices 102 are provided wireless access via at least one base station (not shown) or similar wireless transmitting and/or receiving node or point. A communication device is provided with an appropriate signal receiving and transmitting apparatus for enabling communications, for example enabling access to a communication network or communications directly with other devices. The communication device may access a carrier provided by a station or access point, and transmit and/or receive communications on the carrier.

In the following certain examples are explained with reference to mobile communication devices capable of communication via a wireless cellular system and mobile communication systems serving such mobile communication devices. Before explaining in detail the examples of disclose, certain general principles of a wireless communication system, access systems thereof, and mobile communication devices are briefly explained with reference to FIGS. 1, 2 and 3 to assist in understanding the technology underlying the described examples.

FIG. 1 shows a schematic representation of a 5G system (5GS) 100. The 5GS may comprises a terminal 102, an access network (AN) 106, a 5G core network (5GC) 104, one or more network functions (NF), one or more application function (AF) 108 and one or more data networks (DN) 110.

The 5G-AN 106 may comprise one or more gNodeB (gNB) distributed unit functions connected to one or more gNodeB (gNB) centralized unit functions. The 5G-AN may also contain other forms of Access Networks such as, for example, a non-3GPP interworking function (N3IWF), a trusted non-3GPP gateway function (TNGF), or a wireline access gateway function (W-AGF) (connecting wireline access).

The 5GC 104 may comprise an access and mobility management function (AMF) 112, a session management function (SMF) 114, an authentication server function (AUSF) 116, a user data management (UDM) 118, a user plane function (UPF) 120, a network exposure function (NEF) 122 and/or other NFs. The 5GS may also comprise a policy control function (PCF) which is not shown. Some of the examples as shown below may be applicable to 3GPP 5G standards. However, some examples may also be applicable to 4G, 3G and other 3GPP standards.

In a communication system, such as that shown in FIG. 1, mobile communication devices/terminals or user apparatuses, and/or user equipments (UE), and/or machine-type communication devices are provided with wireless access via at least one base station or similar wireless transmitting and/or receiving node or point. The terminal is provided with an appropriate signal receiving and transmitting apparatus for enabling communications, for example enabling access to a communication network or communications directly with other devices. The communication device may access a carrier provided by a station or access point, and transmit and/or receive communications on the carrier.

Figure 2:
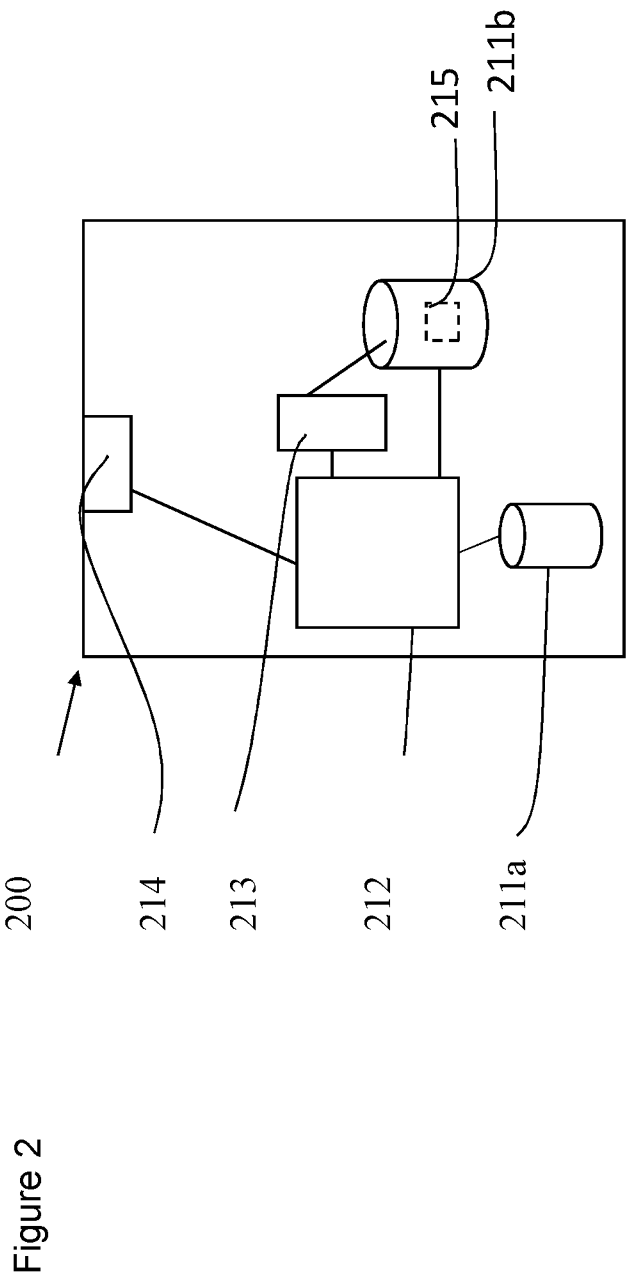
FIG. 2 shows a schematic representation of a control apparatus.

FIG. 2 illustrates an example of a control apparatus 200 for controlling a function of the 5G-AN or the 5GC as illustrated on FIG. 1. The control apparatus may comprise at least one random access memory (RAM) 211*a*, at least one read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5G-AN or the 5GC. In some examples, the function of the 5G-AN and/or the 5GC comprises a control apparatus 200. In alternative examples, two or more functions of the 5G-AN or the 5GC may share a control apparatus.

Figure 3:
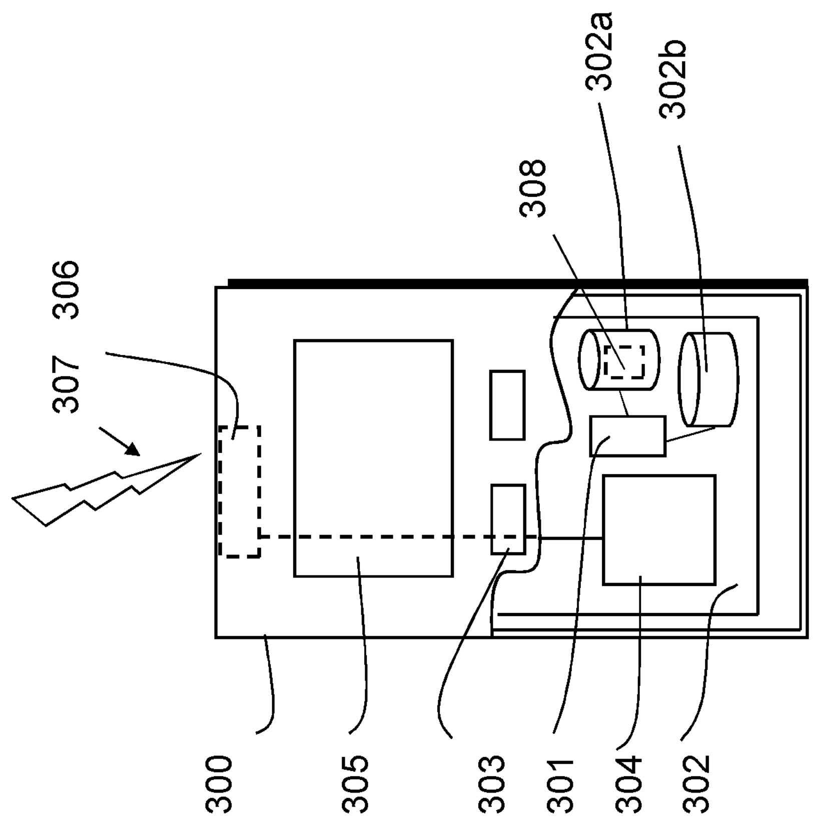
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 302*a* and the ROM 302*b*. The at least one processor 301 may be configured to execute an appropriate software code 308. The software code 308 may for example allow to perform one or more of the present aspects. The software code 308 may be stored in the ROM 302*b*.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

Some of the example embodiments as shown below may be applicable to both 3GPP 4G and 5G standards. However, some example embodiments may also be applicable to 3G and other 3GPP standards.

It has been proposed to have control and user plane separation. This may enable flexible network deployment and operation, by distributed or centralized deployment. This may provide for the independent scaling between control plane and user plane functions, while not affecting the functionality of the existing nodes subject to this split.

Control and user plane separation (CUPS) of evolved packet core (EPC) nodes was introduced into 4G. CUPS is an architectural enhancement feature that introduces the concept of separation between control Plane and user Plane of EPC nodes (such as for example S-GW (serving gateway, P-GW (packet data network), & T-DF (traffic detection function)).

Figure 4:
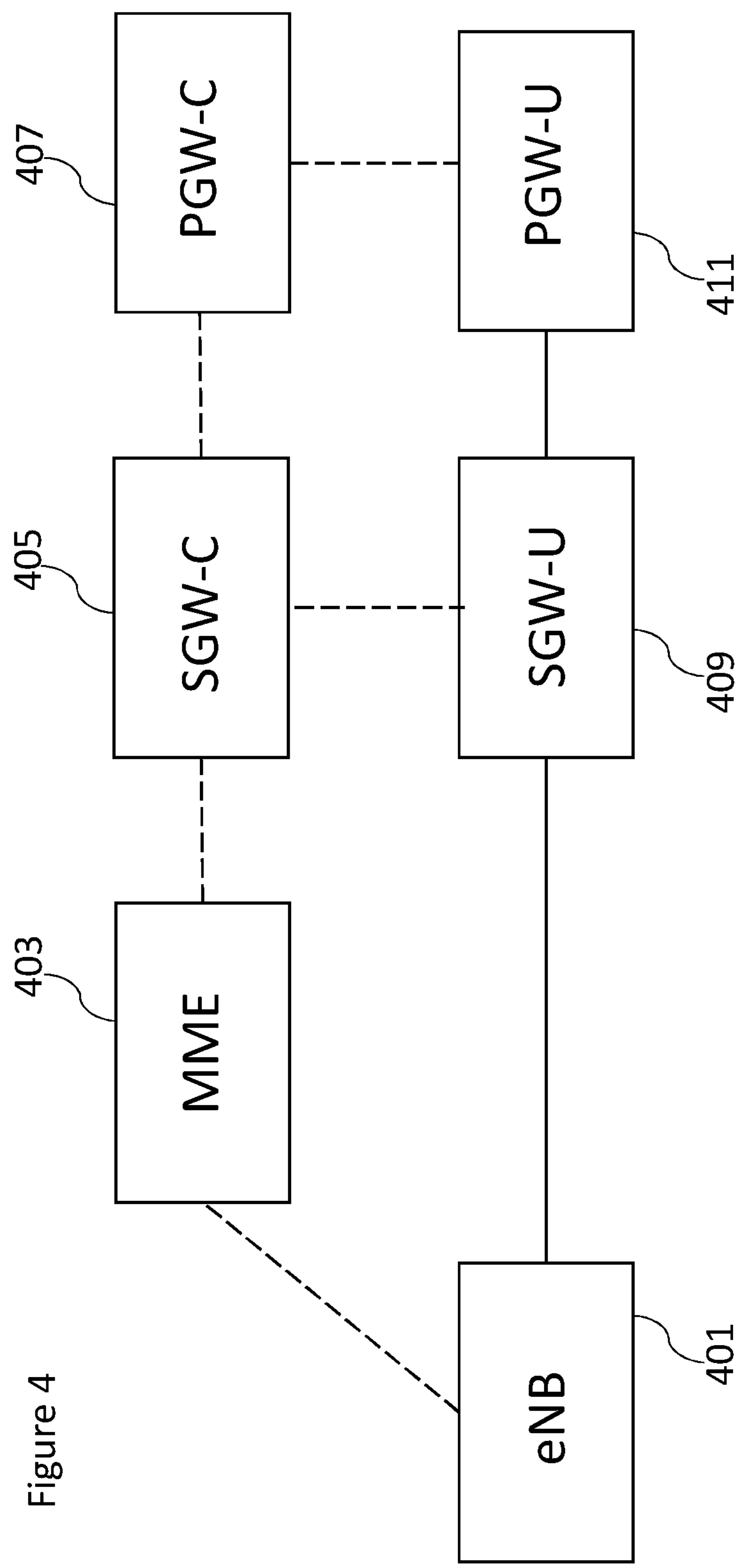
FIG. 4 shows a schematic representation of a 4G system.

An example architecture for such 4G system with CUPS is shown in FIG. 4.

The architecture shows a base station 401 (such as an evolved Node B eNB) which can communicate with a mobile mobility management entity (MME) 403. The base station 401 may be in communication with one or more user equipment (UEs) (not shown). The MME 403 can communicate with a control plane serving gateway 405 (SGW-C) function which in turn can communicate with both a control plane packet data network gateway 407 (PGW-C) function and a user plane serving gateway function 409 (SGW-U). The SGW-U function 409 is also connected to a user plane packet data network gateway function 411 (PGW-U). The PGW-C function 407 can communicate with the PGW-U 411 function.

Therefore, as seen in FIG. 4 the MME 403, the SGW-C and the PGW-C make up the control plane functions, while the eNB 401, the SGW-U 409 and the PGW-U 411 make up the user plane functions. The eNB 401 may comprise of both user plane functions and control plane functions.

In the Rel. 16 5G core network, a session management function (SMF) set may comprise a set of equivalent and inter-changeable SMF instances, from the 3GPP functionality point of view. The SMF set may share the same (packet data unit session) context data. An SMF set may provide distribution, redundancy and scalability when together as a set of SMF instances.

Figure 5:
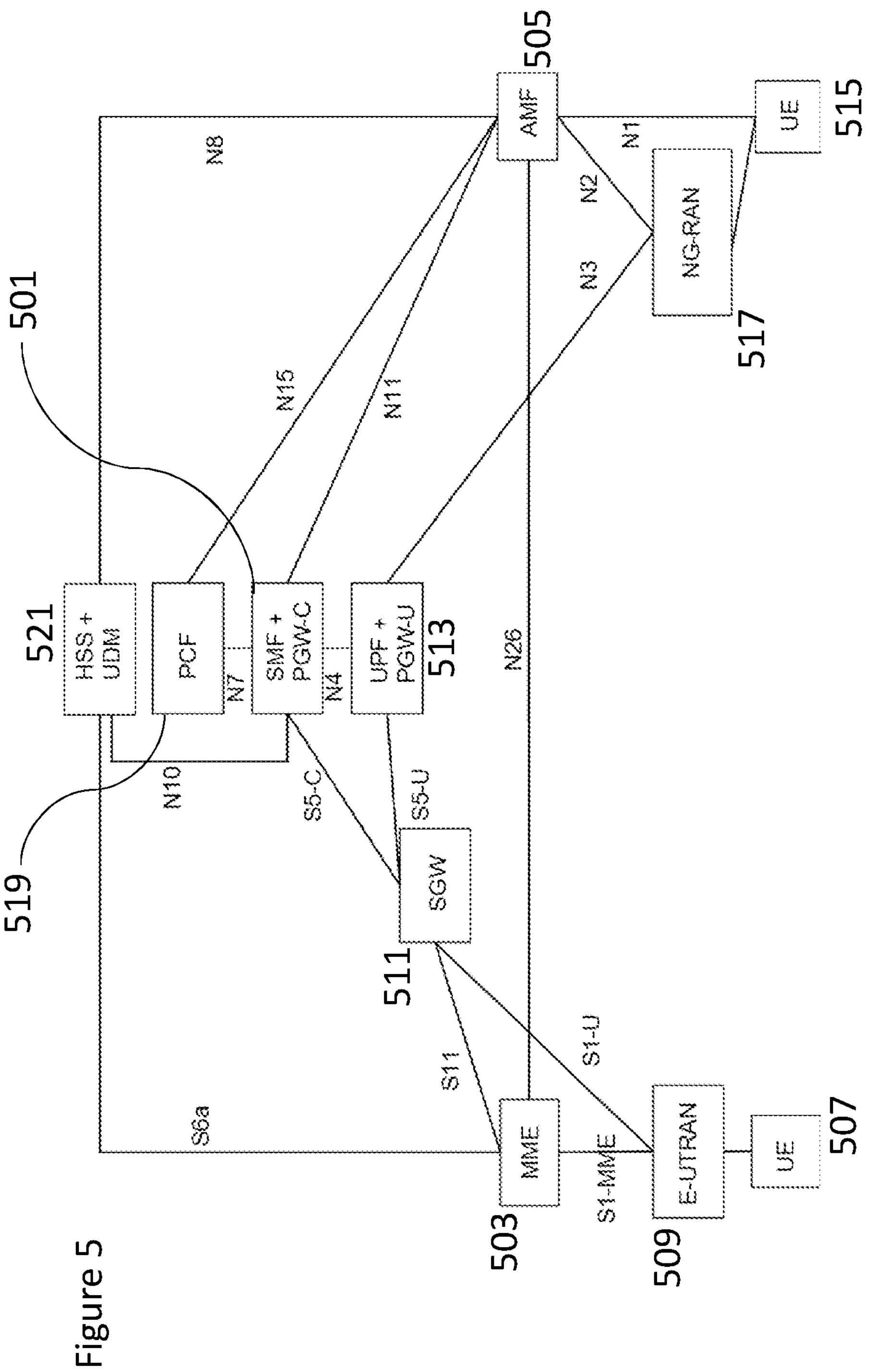
FIG. 5 shows a schematic representation of inter-working between an EPS and a 5G system.

FIG. 5 schematically shows an architecture to support inter-system mobility between an evolved packet system (EPS) and a 5G system (5GS). For EPS interworking, an SMF 501 is co-located with a packet data network (PDN) gateway control plane (PGW-c). PGW-c represents the control plane part of the PGW. In some of the following examples, the SMF located with the PGW-c may be labelled as SMF/PGW-c. The SMF/PGW-c is a combined network entity that acts as an SMF for 5GC peers and that acts as a PGW-c for EPC peers. This allows a data connection (PDU Session/PDN connection) to be moved between EPC and 5GC. An N26 interface may be supported between a mobility management entity (MME) 503 and an access and mobility management function (AMF) 505 for inter-system mobility.

On the EPS side of FIG. 5, a UE 507 is connected to an Evolved UMTS Terrestrial Radio Access Network (E-UTRAN) 509. The E-UTRAN 509 is connected to the MME 503. The MME 503 is connected to a serving gateway (SGW) 511 by an S11 interface. The MME 503 is also connected to a home subscriber server/unified data management HSS/UDM 521 via a S6a interface. The SGW 511 is connected to the SMF/PGW-c 501 via an S5-C interface. The SGW 511 is also connected to a UPF/PGW-u 513 via an S5-U interface.

On the 5GS side, a further UE 515 is connected to a next generation radio access network (NG-RAN) 517. The further UE 515 is also connected to the AMF 505 via an N1 interface. The NG-RAN 517 is also connected to the AMF 505 via an N2 interface. The NG-RAN 517 is connected to the UPF/PGW-u 513 via an N3 interface. The AMF 505 is connected to the SMF/PGW-c 501 via an N11 interface. The AMF 505 is also connected to a policy control function (PCF) 519. The AMF 505 is also connected to the HSS/UDM 521 via an N8 interface.

The UPF/PGW-u 513 is connected to the SMF/PGW-c 501 via N4 interface. The SMF/PGW-c 501 is connected to the PCF 519 via an N7 interface. The SMF/PGW-c 501 is connected to the HSS/UDM 521 via an N10 interface.

In current systems, there is no concept of a PGW-c set in EPC. An SGW can notify an MME of a PGW failure or restart by sending a PGW Restart Notification to MME. In such a case, the MME releases the PDN connections supported by this PGW and requests UEs to re-establish sensitive packet data network (PDN) connections. An example of a sensitive PDN connection is internet protocol multimedia system (IMS) connection. The releasing of the PDN connections causes massive signalling over the radio interface, in the access and core network.

The current systems for inter-system mobility between EPS and 5GS, relying on an SMF/PGW-c combination, may not be suitable with the SMF set concept. It may not be possible to scale-in an SMF set without tearing down and re-establishing the PDN connections of the SMF/PGW-c. In this context, to scale-in an SMF set is the same as removing an SMF/PGW-c instance. Further, an MME cannot reselect a different SMF/PGW-c from the set of SMF/PGW-c instances for an on-going PDN connection if one or more of SMF/PGW-c instances fails. If the SMF/PGW-c instance was to fail, then the PDN connections would be lost and would need to be re-established.

Figure 6:
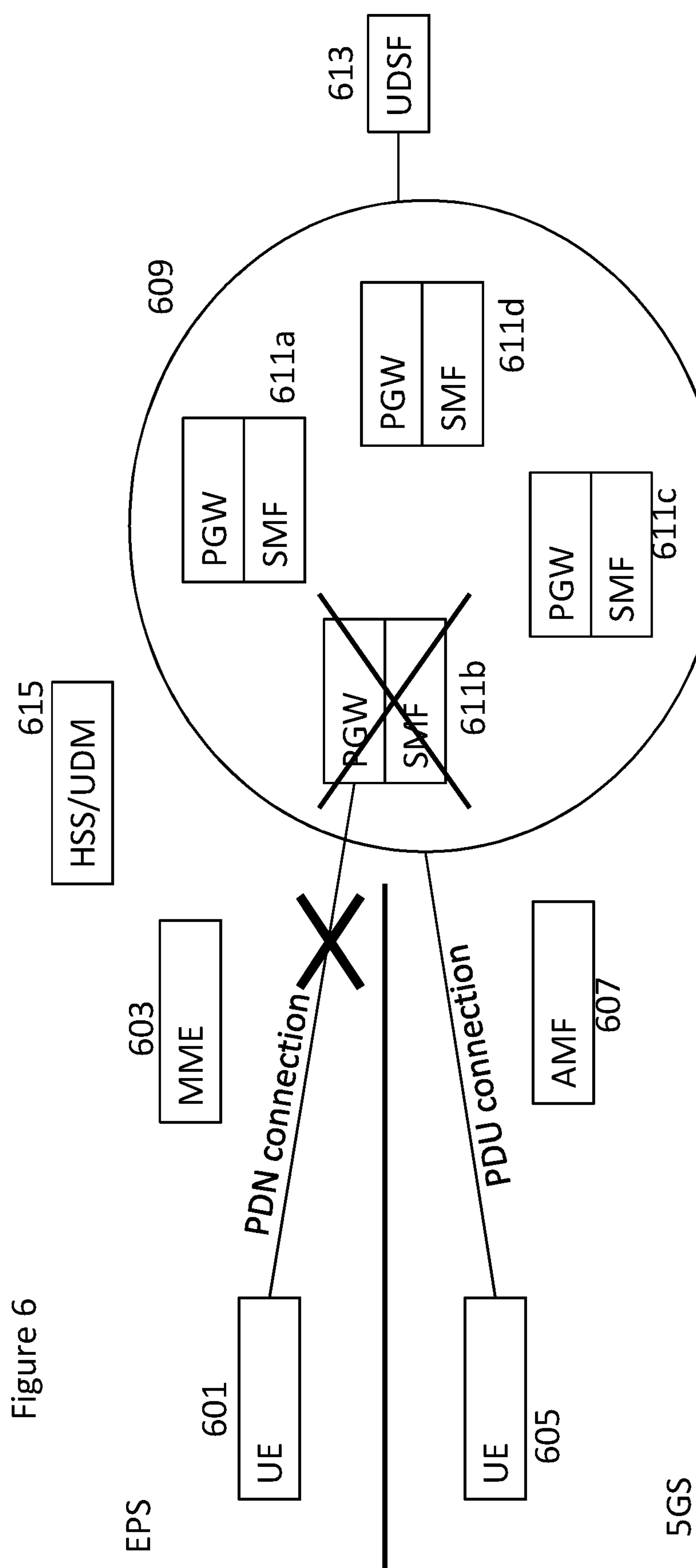
FIG. 6 shows a schematic representation of connections between user equipments and network functions.

The problem is illustrated in FIG. 6. FIG. 6 shows an EPS comprising a UE 601 and an MME 603. A 5GS comprises a further UE 605 and an AMF 607. An SMF set 609 comprises four SMF/PGW-c instances 611*a-d*. The SMF set 609 is accessible to both the EPS and 5GS. The SMF set 609 is associated with an unstructured data storage function 613. There is also provided a home subscriber server/unified data management 615.

FIG. 6 shows a PDN connection between the further UE 605 and the SMF set 609. There is a PDN connection between the UE 601 and SMF/PGW-c that has been broken.

The SMF/PGW-c 611*a-d* instances can be accessible via the 5GS or EPS, to setup PDU sessions (5GS) and PDN connections (EPS). In 5GS, network functions interacting with an SMF can leverage the SMF set concept. If one of the SMF instances fails or is not reachable for any reason for an on-going PDU session, the network functions can reselect another SMF instance from the SMF Set 609. Some examples of why the SMF instances may fail include temporary network failure, overload, SMF instance was de-instantiated during a scale-in operation. Normal operations can proceed for the related PDU session following the reselection.

However, the situation is not the same for PDN connections using EPS, or a situation where a PDU Session established over 5GS has become a PDN connection when the UE has moved into EPS coverage. With current networking specifications an MME cannot reselect a different SMF/PGW-c from the set for an on-going PDN connection if one SMF/PGW-c fails. The PDN connections are lost and need to be re-established. Also, an MME cannot reselect a different SMF/PGW-c from the set for an on-going PDN connection if an SMF/PGW-c instance is de-instantiated. This is shown in FIG. 6 wherein there is a PDN connection between the further UE 605 and the SMF set 609, in the 5GS. If one of the SMF/PGW-c 611*a-d* instances fails or is not reachable then the AMF can reselect another SMF/PGW-c 611*a-d* within the set 609. There is shown a PDN connection between the UE 601 and the SMF/PGW-c 611*b*, in the EPS. If the SMF/PGW-c 611*b* instance fails, is scaled-in or is not reachable, then the PDN connection is lost. The PDN connections will be lost and would need to be re-established.

The following examples and embodiments aim to address one or more of the problems described above.

As mentioned above, an MME cannot reselect a different SMF/PGW-c instance from a set of SMF/PGW-c instances for an on-going PDN connection if one SMF/PGW-c fails, is not reachable or is de-instantiated.

Some examples propose enhancements to the general packet radio services (GPRS) tunnelling protocol control (GTP-C) protocol and to the EPC restoration procedures. Some examples enable the PGW-c to signal a PGW Set fully qualified domain name (FQDN) to the SGW/MME during the PDN connection establishment or during the mobility of a PDU session from 5GC to EPC. When a PGW-c becomes unavailable, the MME does not tear down the PDN connections supported by the PGW-C but instead reselects a new SMF/PGW-c instance from the set based on PGW Set FQDN. This will be described in more detail below.

Figure 7:
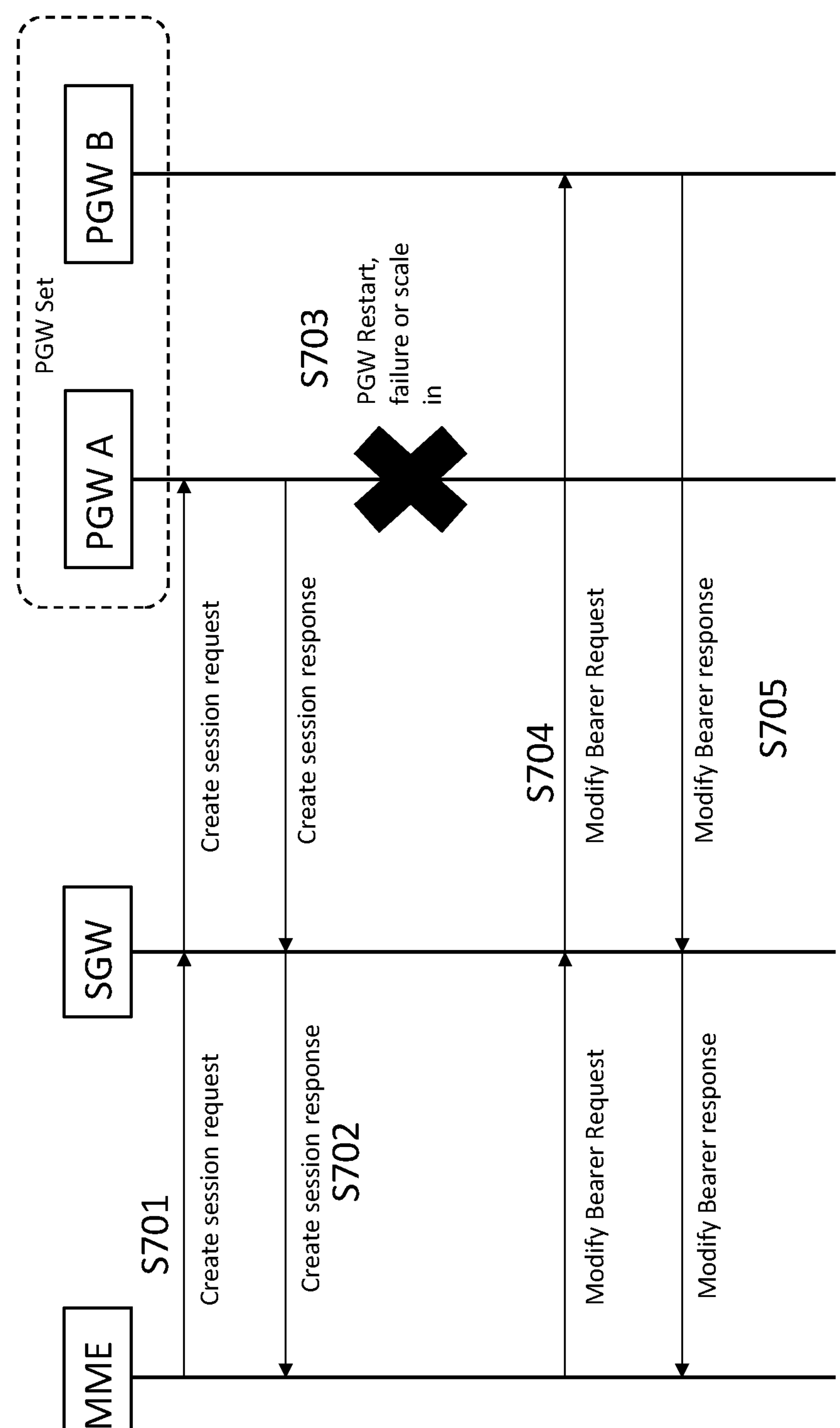
FIG. 7 shows an example signalling diagram between network entities.
Figure 8:
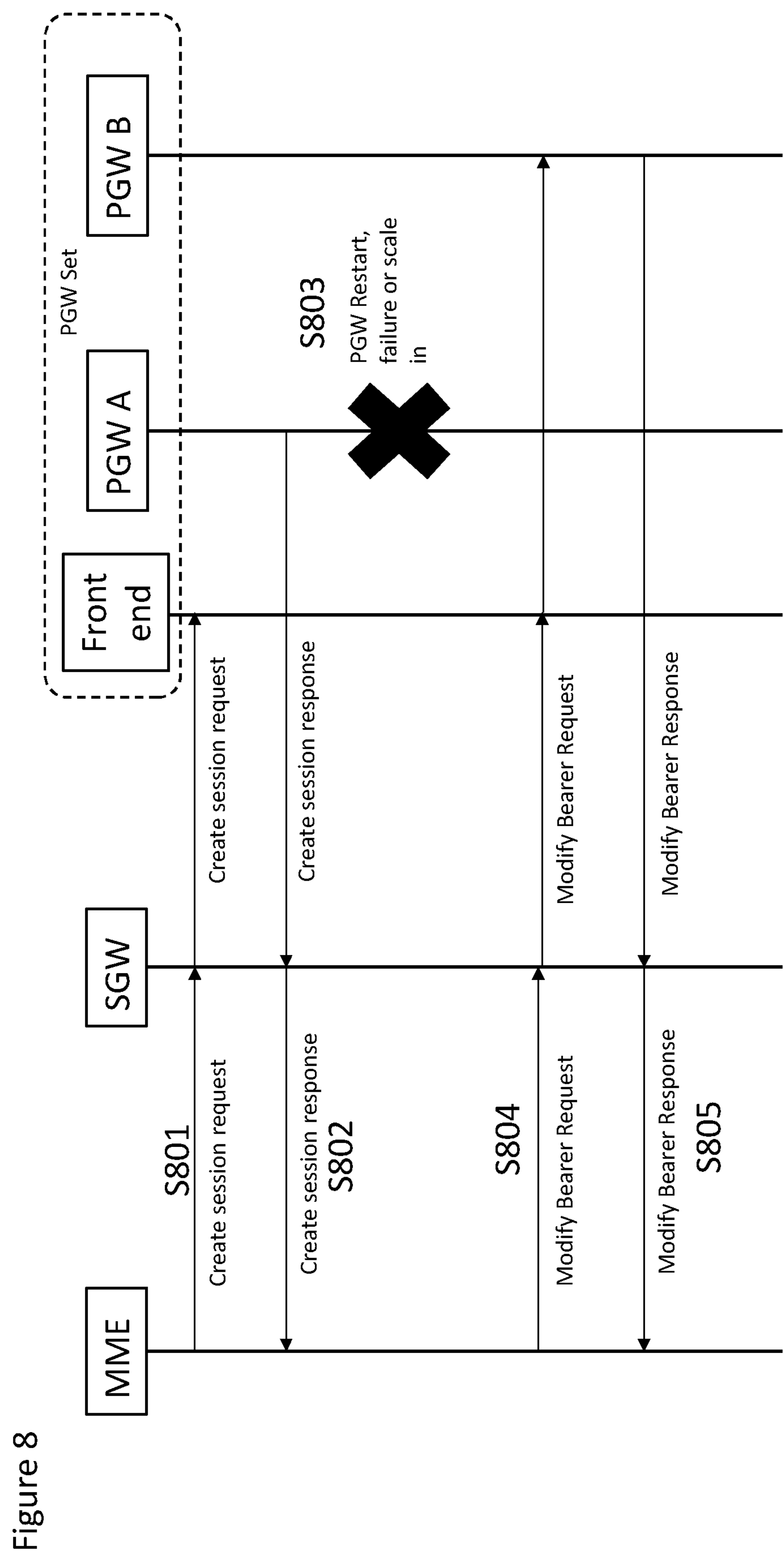
FIG. 8 shows another example signalling diagram between network entities.
Figure 9:
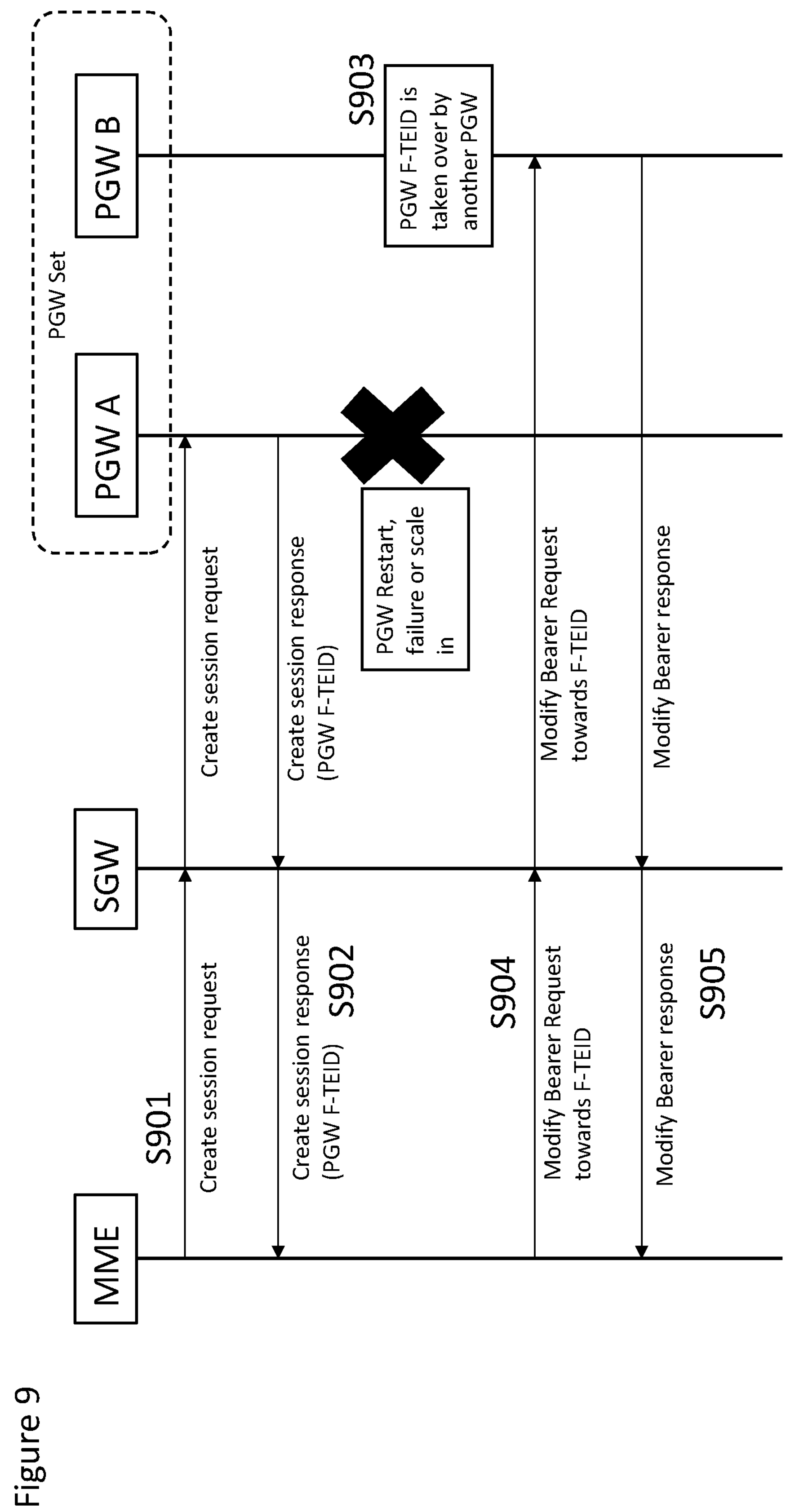
FIG. 9 shows another example signalling diagram between network entities.

Before these examples and embodiments are discussed, some potential alternative solutions are discussed, alongside FIGS. 7 to 9.

FIG. 7 shows an example signalling diagram between an MME, SGW, and first and second PGWs. For a SMF/PGW-c there is a standby SMF/PGW-c. The standby SMF/PGW-c takes over the control of the PDN connections upon failure/scale-in of a PGW-c.

At S701, the MME transmits a create session request to PGW A via the SGW.

At S702, the PGW A transmits a create session response message to the MME via the SGW.

At S703, there is a failure or scale-in or restart of PGW A.

At S704, the MME transmits a modify bearer request to the standby SMF/PGW-c, PGW B, via the SGW.

At S705, PGW B transmits a modify bearer response message to the MME, via the SGW.

Some of the disadvantages of this mechanism is that there may be significant operational expenses to deploy a geo-redundant PGW-c for each PGW-c in the public land mobile network. Furthermore, it does not leverage the SMF set concept in the 5GS. The SMF set allows a cheaper redundancy scheme wherein it is not needed to deploy double signalling resources for the sake of redundancy, as is shown in FIG. 7. Furthermore, this mechanism does not support the preservation of PDN connections during PGW-c scale-in.

FIG. 8 shows an example signalling diagram between an MME, SGW, front end for a PGW set and first and second PGWs of the PGW set. The PGW set supports a front end GPRS tunnelling protocol control plane (GTP-C) relay.

At S801, the MME transmits a create session request to PGW A via the SGW and the front-end relay.

At S802, the PGW A transmits a create session response message to the MME via the SGW. The PGW A may also transmit over S5/S8 a fully qualified tunnel endpoint Identifier, for example, IP address and TEID of the PGW A to the SGW/MME, with a Front-End IP address.

At S803, there is a failure or scale-in or restart of PGW A.

At S804, the MME transmits a modify bearer request via the SGW. This may be targeting the Front-End as an IP address of the Front-End, as communicated by the PGW A in the fully qualified TEID. The Front-End forwards the request to the standby PGW B.

At S805, PGW B transmits a modify bearer response message to the MME, via the SGW.

The front-end entity forwards requests to back end entities processing the requests. Back end entities can scale in, fail, restart transparently for MME/SGWs. Redundant front-end entities, supporting to move one IP address of a front end to another front end for the case where one front end fails are required. This is transparent to MME and to the SGW.

Some of the disadvantages of this mechanism are that this requires a deployment of a new front-end entity in the existing EPC. Furthermore, the front end has to handle the GTP-c traffic for a SMF/PGW-c cluster, which may have a high signalling cost. Furthermore, the front end has to be duplicated, with a floating IP address, and to keep the association (be stateful) between a fully qualified tunnel endpoint identifier control plane (F-TEID-c) and an SMF/PGW-c instance, which has a signalling cost.

FIG. 9 shows an example signalling diagram between an MME, SGW, and first and second PGWs of a PGW set. In the case of PGW failure or scale in, the PGW-c F-TEID is taken over by another PGW. In this context, to be taken over means that the F-TEID is taken by the another PGW. This may be transparent to the MME and/or SGW.

At S901, the MME transmits a create session request to PGW A via the SGW.

At S902, the PGW A transmits a create session response message to the MME via the SGW. The create session response message may comprise a PGW fully qualified tunnel endpoint identifier (F-TEID).

At S903, there is a failure or scale-in or restart of PGW A.

At S904, the MME transmits a modify bearer request to the standby SMF/PGW-c, PGW B, via the SGW.

At S905, PGW B transmits a modify bearer response message to the MME, via the SGW.

Some of the disadvantages of this mechanism are that a PGW set might cross different subnets, even data centres for supporting geo-redundancy. Furthermore, this mechanism may utilise the border gateway protocol (BGP) or another protocol which might take a non-acceptable time for the network to converge. PDN connections of a failed/scaled-in PGW may need to be taken over by the same other PGW, which may not be possible or cause overload on the new PGW.

As mentioned above, some examples enable the PGW-c to signal a PGW set fully qualified domain name (FQDN) to the SGW/MME during the PDN connection establishment. This may also occur during the mobility of a PDU session from 5GC to EPC. When a PGW-c becomes unavailable, the MME does not tear down the PDN connections supported by the PGW-c. In some examples, the MME may reselect a new SMF/PGW-c instance from the set based on the PGW Set FQDN. In these examples, the MME supports transferring the PDN connection from one PGW instance to another PGW instance.

FIG. 10 shows an example signalling diagram between network entities. In this example, the communications take place between an MME, an SGW, an HSS, a first network function instance (labelled 'PGW A'), and a second network function (labelled 'PGW B'). The first and second network function instances may be part of a network function set. In this example, PGW A depicts a PGW-c that will fail, be disconnected or be scaled in. In this example, PGW B depicts a PGW-c within the PGW-c set that will be selected to take over, in order to serve a PDN connection that used to be served by PGW-A. The first and second network function instances may be SMF/PGW-c instances. In other examples, the first and second network function instances may be PGW-c instances. In other examples, one or more entities may not take part in the communications. In other examples, one or more additional entities may take part in the communications. A user equipment (UE) may be associated with the MME. A user subscriber may be associated with the MME. The UE may maintain a PDN connection context associated with a network function instance that is part of the set. In the notation below, the SMF/PGW-c set may be referred to as the PGW set.

At S1001, the MME provides a request message to the SGW. The request message may be, for example, a create session request message. The SGW forwards the request message to the PGW A. The SGW will forward the request message to the PGW A using an IP address indicated by the MME. When the MME provides the request message, the MME may signal a flag indicating support for the following enhancements. For example, the MME may set a flag that indicates that the MME supports transferring a PDN connection from one PGW instance to another PGW instance. For example, the flag may be a "PGW set FQDN support indication".

At S1002, the PGW A provides a response message to the SGW. The response message may be, for example, a create session response message. The response message may comprise information about an identification of the PGW set. In an example, the information about an identification of the PGW set may comprise a domain name of the PGW set. In another example, the response message may comprise a PGW set FQDN. The response message may include the information about the identification of the PGW set when the MME has signalled the flag indicating that the enhancements are supported, as discussed in S1001. The SGW then forwards the response message to the MME.

At S1003*a*, the PGW A is down due to a restart. In other examples, PGW A is down due to a failure. PGW A may be down for any suitable reason.

At S1003*b*, the PGW A is de-instantiated. PGW A may be de-instantiated due to, for example, a scale-in scenario.

At S1004, if PGW A is de-instantiated, then the access point name (APN) related domain name server (DNS) records are updated to remove PGW A. The DNS records may be updated by an operation, administration and maintenance (OAM) entity. The PGW A may provide an echo request to the SGW. The echo request being a GTP-u type message. The echo request may comprise an incremented restart counter. If the PGW A is de-instantiated, then the echo request may comprise a new restart timer instead. In other examples, rather than receiving an echo request at the SGW, the SGW detects a confirmed absence of PGW A answers. For example, an absence of responses to echo request messages received by PGW A.

At S1005, when the SGW has detected that PGW A has failed/restarted/de-instantiated, the SGW provides a restart notification to the MME. The SGW may have detected that PGW A has failed/restarted/de-instantiated due to the reception of the echo request message. In other examples, the SGW may have detected that PGW A has failed/restarted/de-instantiated due to an absence of responses from PGW A. If PGW A has failed/restarted/de-instantiated, then the PGW could be thought of as no longer available to hold the PDN connection. The restart notification may be, for example, a PGW restart notification. In an example, when the MME receives notification that the PGW A is no longer available and the MME has received for this PDN connection an identification of the PGW set, the MME maintains the PDN connection context. The MME maintains the PDN connection instead of initiating the release of the PDN Connection as defined in current 3GPP specifications. The MME may maintain the PDN connection context so that it can be transferred to be controlled by a different PGW in the set. The identification of the PGW set may comprise a PGW set FQDN. In other examples, the identification of the PGW set may comprise other suitable identifying information. The context of the PDN connection may comprise, for example, at least one of: an international mobile subscriber identity, an international mobile equipment identity, a globally unique temporary identity, an access point name, a packet data gateway identifier, a packet data gateway internet protocol address for an S5 or S8 interface, a packet data gateway tunnel endpoint identifier for an S5 or S8 interface, a mobility management entity internet protocol address for an S11 interface, a mobility management entity tunnel endpoint identifier for the S11 interface and a serving gateway internet protocol address for the S11 interface.

At S1006, the MME selects a new PGW based on the received PGW set FQDN. In this example, the MME selects PGW B. PGW B may be part of the SMF/PGW-c set. The MME may perform the selection in response to receiving the restart notification from the SGW. The MME may not tear down related PDN connections. In some examples, step S1006 may not take place immediately after step S1005

At S1007, the MME provides information about the UE to the SGW. The SGW propagates this information to the PGW-c B. The information about the UE may comprise a UE identification. The MME may also provide the linked EPS bearer identifier (EBI) to the SGW. The EBI may identify the default EPS bearer of the PDN connection. The information about the UE and the EBI may help the new PGW-c (i.e. PGW B) find out the PDN connection and take it over. In this context, to take it over means to take control of the PDN connection. The information about the UE and the EBI may be comprised within a modify bearer request message, provided to the SGW. The MME may send the modify bearer request immediately or send any of the aforementioned information to the PGW when corresponding signalling interaction needs to take place. The SGW may forward the information about the UE and the EBI to PGW B. In another example, the SGW may forward the modify bearer request message comprising the information about the UE and the EBI to PGW B. In other examples, the MME may provide the information about the UE and the EBI directly to the PGW B.

At S1008, PGW B provides a response message to the SGW. The response message may be a modify bearer response message. The message may comprise identifying information for PGW B. For example, the message may comprise a fully qualified tunnel endpoint identifier (F-TEID) of the PGW B. The F-TEID may be an S5/S8 F-TEID for control plane of the PGW B. The response message may comprise a name of PGW B. In some examples, the response message may comprise an FQDN of the PGW B. The PGW B may provide the PGW B F-TEID and PGW B name/PGW B FQDN to the SGW in the response message. In other examples, the PGW B may provide the PGW B F-TEID and PGW B name/PGW B FQDN to the SGW in response to any of the aforementioned requests. However, if PGW B were to receive a delete session request then there is no need to return the PGW B F-TEID and PGW B name/PGW B FQDN. The SGW will then forward the response message to the MME. In other examples, the PGW B communicates directly with the MME.

At S1009, the MME provides the received information about the name of the PGW B to the home subscriber service (HSS). This may update the PGW identity for the PDN connection in the HSS. The HSS may also update the PGW identity in a UDM of a 5GS.

At S1010, the HSS notifies the MME that the identity of the PGW has been updated. PGW B is now linked with the PDN connection.

For PDU session establishment in 5GS, the PDU session is established in 5GS as specified in existing procedures. The AMF may handle the SMF set as per existing specifications, as well. In some situations, a PDU session may be handed over to EPC. The handover may occur with or without an N26 interface. During the mobility of the PDU session towards EPS, the PGW provides the PGW set FQDN, in the Modify Bearer Response, to the MME. In other examples, the PGW provides the PGW set FQDN in another suitable message type. After this, the same procedures as described for PDN connections established in EPS apply, as shown in the signalling diagram of FIG. 10.

Figure 11:
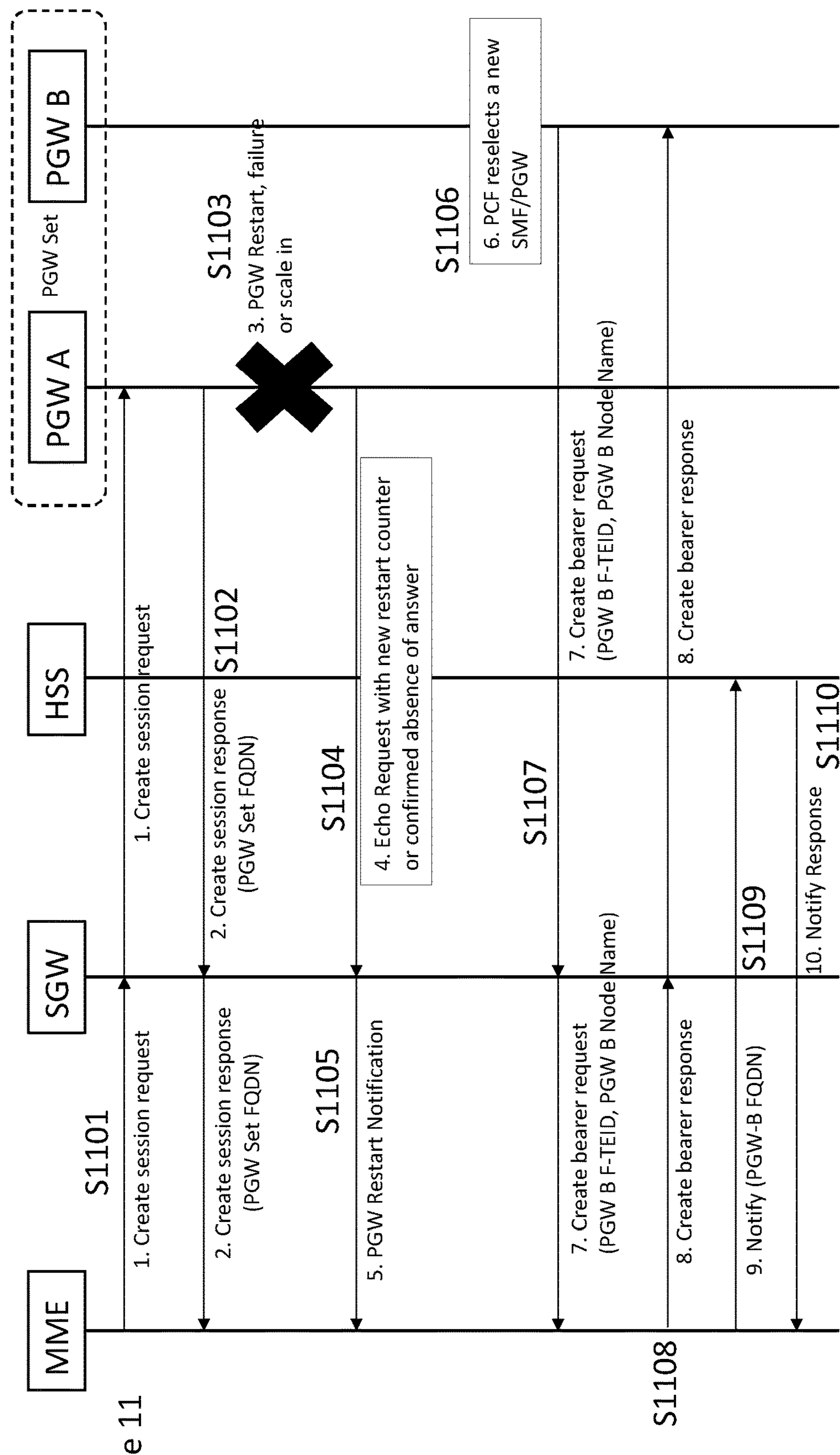
FIG. 11 shows another example signalling diagram between network entities.

FIG. 11 shows another example signalling diagram between network entities. The following signalling may occur if a new SMF/PGW-c instance taking over control of a PDN connection is to initiate a request towards the MME, but no request has been received from the MME/SGW enabling the new SMF/PGW-c instance to return a PGW-c F-TEID, as described above with respect to FIG. 10. In FIG. 11, the communications take place between an MME, a SGW, an HSS, a first network function instance (labelled ‘PGW A’), and a second network function (labelled ‘PGW B’). The first and second network function instances may be part of a network function set. In this example, PGW A depicts a PGW-c that will fail, be disconnected or be scaled in. In this example, PGW B depicts a PGW-c within the PGW-c set that will be selected to take over in order to serve a PDN connection that used to be served by PGW-A. The first and second network function instances may be SMF/PGW-c instances. In other examples, the first and second network function instances may be PGW-c instances. In some examples, one or more entities may not take part in the communications. In other examples, one or more additional entities may take part in the communications. A user equipment (UE) may be associated with the MME. The UE may maintain a PDN connection associated with a network function instance that is part of the set. In the notation below, the SMF/PGW-c set may be referred to as the PGW set.

At S1101, the MME provides a request message to the SGW. The request message may be, for example, a create session request message. The SGW forwards the request message to the PGW A. The SGW will forward the request message to the PGW A using an IP address indicated by the MME. When the MME provides the request message, the MME may signal a flag indicating support for the following enhancements. For example, the flag may be a “PGW Set FQDN Support indication”.

At S1102, the PGW A provides a response message to the SGW. The response message may be, for example, a create session response message. The SGW then forwards the response message to the MME The response message may comprise a PGW Set FQDN. The response message may include the PGW Set FQDN when the MME has signalled the flag indicating that the enhancements are supported, as discussed in S1101.

At S1103, the PGW A is down due a restart. In other examples, PGW A is down due to a failure. In other examples, the PGW A is de-instantiated. PGW A may be de-instantiated due to, for example, a scale-in scenario. PGW A may be down for any suitable reason.

At S1104, if PGW A is de-instantiated/restarted/failed, then the access point name (APN) related domain name server (DNS) records are updated to remove PGW A. The DNS server records may be updated by an OAM. The PGW A may provide an echo request to the SGW. The echo request may comprise an incremented restart counter. If the PGW A is de-instantiated, then the echo request may comprise a new restart timer instead. In other examples, rather than receiving an echo request at the SGW, the SGW detects a confirmed absence of PGW A answers. For example, an absence of responses to echo request messages received by PGW A.

At S1105, when the SGW has detected that PGW A has failed/restarted/de-instantiated, the SGW provides a restart notification to the MME. The SGW may have detected that PGW A has failed/restarted/de-instantiated due to the reception of the echo request message. In other examples, the SGW may have detected that PGW A has failed/restarted/de-instantiated due to an absence of responses from PGW A. The restart notification may be, for example, a PGW restart notification.

At S1106, another SMF/PGW-c from the SMF/PGW-c is selected for the PDN connection. In the example of FIG. 11, PGW B is selected for the PDN connection. A PCF may perform the selection. The PCF may perform the selection when the PCF needs to send a request to the SMF for this PDN connection. In other examples, one of the UPF and PGW-u may perform the selection. In other examples, other suitable network functions may perform the selection.

At S1107, PGW B provides a request message to the SGW. The request message may be a create bearer request message. In other examples, the request message may be one of an update bearer request, and a delete bearer request. The message may comprise identifying information for PGW B. For example, the message may comprise a fully qualified tunnel endpoint identifier (F-TEID) of the PGW B. The F-TEID may be an S5/S8 F-TEID for control plane of the PGW B. The request message may comprise a name of the PGW B. In some examples, the information about the name of PGW B may comprise, an FQDN of the PGW B. The PGW B may provide the PGW B F-TEID and PGW B name/PGW B FQDN to the SGW in the request message. The SGW will then forward the request message to the MME. The MME may store the PGW B F-TEID and/or PGW B name information and/or PGW B FQDN. The SGW may also store the PGW B F-TEID and/or PGW B name information and/or PGW B FQDN.

At S1108, the MME provides a response message to the SGW. The response message may be a create bearer response message. The SGW then forwards the response message to the PGW B. In other examples, the MME may provide the response message to the PGW B directly.

At S1109, the MME provides the PGW B FQDN and/or PGW B name information to the home subscriber server (HSS). This may update the PGW identity for the PDN connection in the HSS. The HSS may also update the PGW identity in a UDM of a 5GS.

At S1110, the HSS notifies the MME that the identity of the PGW has been updated. PGW B is now linked with the PDN connection.

A similar example to the signal flow described alongside FIG. 11 may take place in some other examples as described below.

When the MME has decided not to immediately select a new PGW-c, it may happen that the PGW-u/UPF having detected that the PGW A has failed, and needing to contact a SMF/PGW-c (e.g. due to usage monitoring reporting from the PGW-u/UPF), selects another PGW-c in the set, for example, PGW B. In this case, PGW B takes over from PGW A for a PDN connection. This would be another trigger for step 6 in FIG. 11.

The newly selected PGW B may want to notify the MME that it has taken over from PGW A for the PDN connection. In this case, the PGW B initiates an update bearer request message for the MME, similar to step S1107 of FIG. 11. The update bearer request message may provide the following information: a fully qualified tunnel endpoint identifier (F-TEID) of the PGW B. The F-TEID may be an S5/S8 F-TEID for control plane of the PGW B. The request message may comprise a name of the PGW B. In some examples, the information about the name of PGW B may comprise, an FQDN of the PGW B. The PGW B may provide the PGW B F-TEID and PGW B name/PGW B FQDN to the SGW in the request message. The SGW will then forward the request message to the MME. The rest of the procedure takes place as described in S1108, S1109 and S1110 of FIG. 11 above.

Some examples below show how embodiments allow inter-PLMN compatibility while different networks (PLMN) may have different policies as to whether and when to deploy this new feature. In an example, if a visited public land mobile network (VPLMN) (i.e. MME) supports the additional features as described above, but a home public land mobile network (HPLMN) (i.e. PGW) does not support the additional features, then the additional features are not applied. In this case, the behaviour remains as specified in existing specifications.

In another example, if a HPLMN (PGW) supports the additional features but the VPLMN (MME) does not support the additional features, then the additional features are not applied. In this case, the behaviour remains as specified in existing specifications as the visited public land mobile network (VPLMN) ignores the new information provided by the PGW as part of the examples described above in FIGS. 10 and 11. At a PGW restart notification, PDU Sessions are released. The PGW-C may then delete the PDN connection contexts. Deleting the PDN connection contexts may avoid hanging contexts.

Some of the advantages of the examples given are that there is support for SMF/PGW-C failure and/or scale-in, without any tearing down or re-establishing of PDN connections for UEs in EPC (and no radio signalling). This is achieved without a requirement to deploy new entities in EPC nor geo-redundant PGWs, thus optimising significantly operational expenses (OPEX). Furthermore, the concept of SMF sets of 5GS is fully leveraged with EPS interworking.

Figure 12:
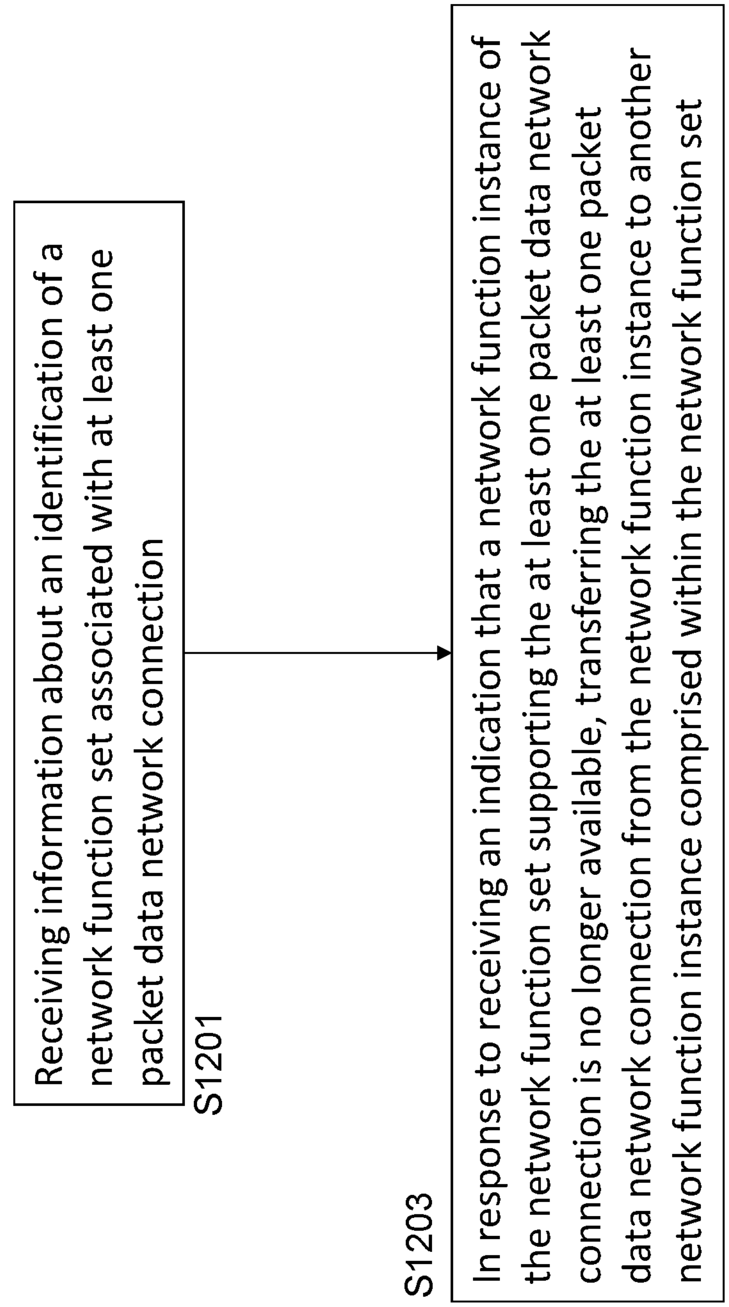
FIG. 12 shows example method steps performed by a first network entity.

FIG. 12 shows an example method flow performed by an apparatus. The first apparatus may be comprised within a network entity. The network entity may be, for example, an MME.

In S1201, the method comprises receiving information about an identification of a network function set associated with at least one packet data network connection.

In S1203, the method comprises in response to receiving an indication that a network function instance of the network function set supporting the at least one packet data network connection is no longer available, transferring the at least one packet data network connection from the network function instance to another network function instance comprised within the network function set.

FIG. 13 shows an example method flow performed by an apparatus. The first apparatus may be comprised within a network entity. The network entity may be, for example, a PGW instance. In another example, the network entity may be an SMF/PGW-c instance.

In S1301, the method comprises providing information about an identification of a network function set associated with at least one packet data network connection.

FIG. 14 shows an example method flow performed by an apparatus. The first apparatus may be comprised within a network entity. The network entity may be, for example, a PGW instance. In another example, the network entity may be an SMF/PGW-c instance.

In S1401, the method comprises receiving a request to transfer at least one packet data network connection from a network function instance within a network function set to another network function instance comprised within the network function set.

In S1403, the method comprises providing an indication that the at least one packet data network connection has been transferred to the another network function instance, the indication comprising information about an identification of the another network function instance.

FIG. 15 shows a schematic representation of non-volatile memory media 1500*a* (e.g. computer disc (CD) or digital versatile disc (DVD)) and 1500*b* (e.g. universal serial bus (USB) memory stick) storing instructions and/or parameters 1502 which when executed by a processor allow the processor to perform one or more of the steps of the method of FIGS. 12 to 14.

It is noted that while the above describes example embodiments, there are several variations and modifications which may be made to the disclosed solution without departing from the scope of the present invention.

The examples may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures, e.g., as in FIGS. 12 and 13, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples.

Alternatively or additionally some examples may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising:

at least one processor and at least one memory including computer program code, wherein the at least one memory and the computer program code are configured, with the at least one processor, to cause the apparatus to at least perform:

receiving information about an identification of a network function set associated with at least one packet data network connection, wherein the apparatus is comprised in or comprises a mobility management entity; and in response to receiving an indication that a network function instance of the network function set supporting the at least one packet data network connection is no longer available, maintaining a context of the at least one packet data network connection, and transferring the at least one packet data network connection from the network function instance to another network function instance comprised within the network function set, wherein the transferring the at least one packet data network connection to the another network function instance comprises providing a message comprising an identification of a user subscription, or user equipment, associated with the at least one packet data network connection, and an information about a default bearer for the at least one packet data network connection, to the another network function instance.

2. The apparatus as claimed in claim 1, wherein the apparatus is further configured for initiating a transfer of the at least one packet data network connection from the network function instance to another network function instance comprised within the network function set.

3. The apparatus as claimed in claim 1, wherein the apparatus is further configured for receiving a transfer request for the at least one packet data network connection from the network function instance to another network function instance comprised within the network function set.

4. The apparatus as claimed in claim 1, wherein the information about the identification of the network function set is received during one of: a packet data network connection establishment, and an inter-system mobility of a packet data connection.

5. The apparatus as claimed in claim 1, wherein the context of the at least one packet data network connection comprises at least one of: an international mobile subscriber identity, an international mobile equipment identity, a globally unique temporary identity, an access point name, a packet data gateway identifier, a packet data gateway internet protocol address for an S5 or S8 interface, a packet data gateway tunnel endpoint identifier for an S5 or S8 interface, a mobility management entity internet protocol address for an S11 interface, a mobility management entity tunnel endpoint identifier for the S11 interface and a serving gateway internet protocol address for the S11 interface.

6. The apparatus as claimed in claim 1, wherein the apparatus is further configured to perform: selecting the another network function instance of the network function set for the at least one packet data network connection to be transferred to, based on the received information about an identification of a network function set.

7. The apparatus as claimed in claim 1, wherein the apparatus is further configured to perform: receiving an indication that the another network function instance has been selected for the at least one packet data network connection.

8. The apparatus as claimed in claim 1, wherein the information about the another network function instance comprises an internet protocol address and control plane identifier of a general packet radio services tunnelling protocol control plane tunnel for the packet data network connection at the another network function instance.

9. The apparatus as claimed in claim 1, wherein at least one of the network function instance and the another network function instance comprises a session management function/packet data network gateway control plane, SMF/PGW-c, instance.

10. The apparatus as claimed in claim 1, wherein the information about the identification of the network function set is comprised within one of: a create session response message, and a modify bearer response message.

11. The apparatus as claimed in claim 1, wherein the information about the identification of the network function set comprises a domain name of the network function set.

12. The apparatus as claimed in claim 1, wherein the apparatus is further configured to perform: notifying a home subscriber server that the at least one packet data network connection has been transferred from the network function instance to the another network function instance, so that the home subscriber server is caused update stored information about the at least one packet data network connection.

13. The apparatus as claimed in claim 1, wherein the apparatus is comprised within one of: a mobility management entity, and a serving gateway entity.

14. A method comprising:

receiving, by a mobility management entity, information about an identification of a network function set associated with at least one packet data network connection;

in response to receiving an indication that a network function instance of the network function set supporting the at least one packet data network connection is no longer available, maintaining a context of the at least one packet data network connection, and transferring, by the mobility management entity, the at least one packet data network connection from the network function instance to another network function instance comprised within the network function set, wherein the transferring the at least one packet data network connection to the another network function instance comprises providing a message comprising an identification of a user subscription, or user equipment, associated with the at least one packet data network connection, and an information about a default bearer for the at least one packet data network connection, to the another network function instance.

15. The method as claimed in claim 14, further comprising initiating a transfer of the at least one packet data network connection from the network function instance to another network function instance comprised within the network function set.

16. The method as claimed in claim 14, further comprising receiving a transfer request for the at least one packet data network connection from the network function instance to another network function instance comprised within the network function set.

17. The method as claimed in claim 14, wherein the information about the identification of the network function set is received during one of: a packet data network connection establishment, and an inter-system mobility of a packet data connection.

18. The method as claimed in claim 14, wherein the context of the at least one packet data network connection comprises at least one of: an international mobile subscriber identity, an international mobile equipment identity, a globally unique temporary identity, an access point name, a packet data gateway identifier, a packet data gateway internet protocol address for an S5 or S8 interface, a packet data gateway tunnel endpoint identifier for an S5 or S8 interface, a mobility management entity internet protocol address for an S11 interface, a mobility management entity tunnel endpoint identifier for the S11 interface and a serving gateway internet protocol address for the S11 interface.

* * * * *